United States Patent [19]

Waters et al.

[11] 4,359,766

[45] Nov. 16, 1982

[54] METHOD FOR RECONNAISSANCE GEOPHYSICAL PROSPECTING

[76] Inventors: Kenneth H. Waters, P.O. Box 289, Kaw City, Kay County, Okla. 74641; George W. Rice, 1624 Dover, Ponca City, Kay Couty, Okla. 74601; Anthony J. Scanlan, 6518 Coral Ridge, Houston, Harris County, Tex. 77069; Beverly B. Stebens, 1505 Trio La., PoncaCity, Kay County, Okla. 74601

[21] Appl. No.: 708,437

[22] Filed: Jul. 26, 1976

Related U.S. Application Data

[63] Continuation-in-part of Ser. No. 174,744, Aug. 15, 1971, abandoned.

[51] Int. Cl.³ .......................... G01V 1/20; G01V 1/30
[52] U.S. Cl. ......................................... 367/38; 367/47; 367/53; 367/56; 367/63; 367/73; 364/421
[58] Field of Search ............... 340/15.5 MC, 15.5 CP, 340/15.5 DP, 15.5 SS; 444/1; 367/37, 38, 53, 56, 59, 73, 47; 364/421

[56] References Cited

U.S. PATENT DOCUMENTS

| | | | |
|---|---|---|---|
| 3,409,870 | 11/1968 | Mounce et al. | 340/15.5 MC |
| 3,529,282 | 9/1970 | Brown et al. | 340/15.5 CP |
| 3,611,278 | 10/1971 | Girinzy et al. | 340/15.5 DP |
| 3,731,270 | 1/1972 | Stephenson | 340/15.5 DP |
| 3,753,222 | 8/1973 | Trostle | 340/15.5 MC |

OTHER PUBLICATIONS

*The Use of a Least Squares Method for the Interpretation of Data from Seismic Surveys*, Scheidegger et al., Geophysics, vol. 22, Jan. 1957, pp. 9–22.

Primary Examiner—Howard A. Birmiel
Attorney, Agent, or Firm—Leydig, Voit, Osann, Mayer and Holt, Ltd.

[57] ABSTRACT

A method for deriving seismic information of more generalized nature over a relatively large and previously unexplored expanse of land to determine relevant strike, dip, velocity and related information. The method consists of the placing of a plurality of seismic sources and receivers in respective lines arranged in a cross pattern, each line being generally at right angles each to the other, and thereafter exciting the sources and recording the received energy for further processing to derive the strike, dip and velocity information for selected strata by using travel times of signal return.

24 Claims, 26 Drawing Figures

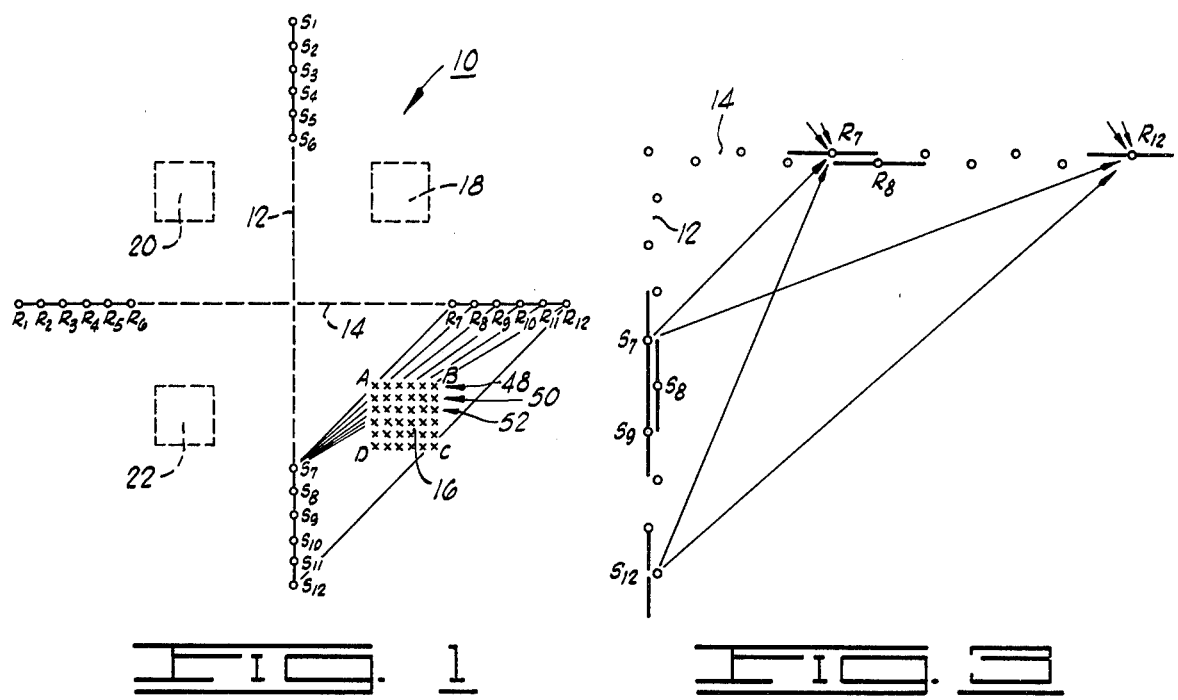
FIG. 1
FIG. 3
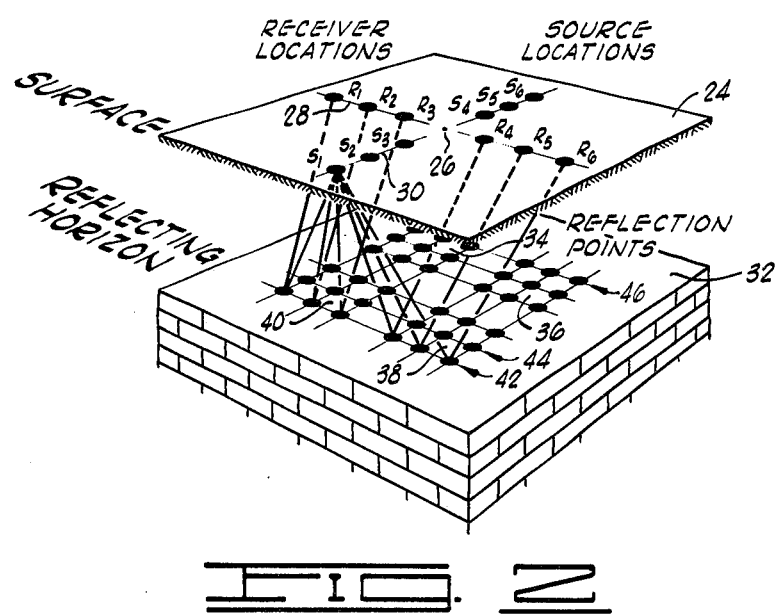
FIG. 2

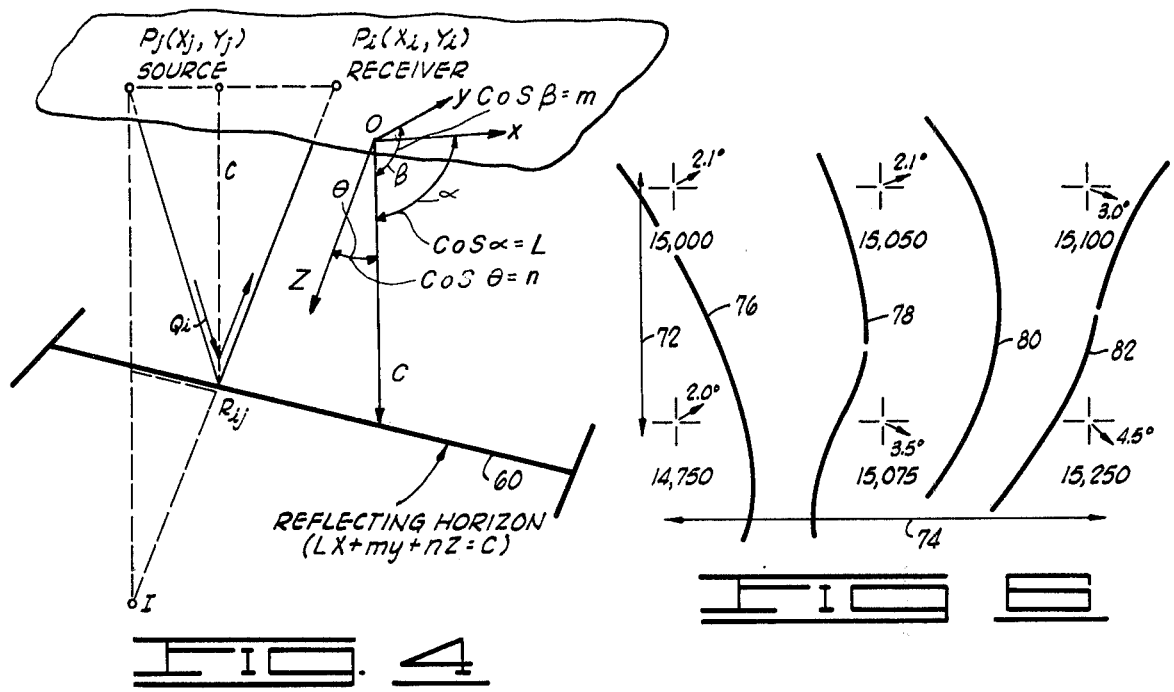
FIG. 4
FIG. 5
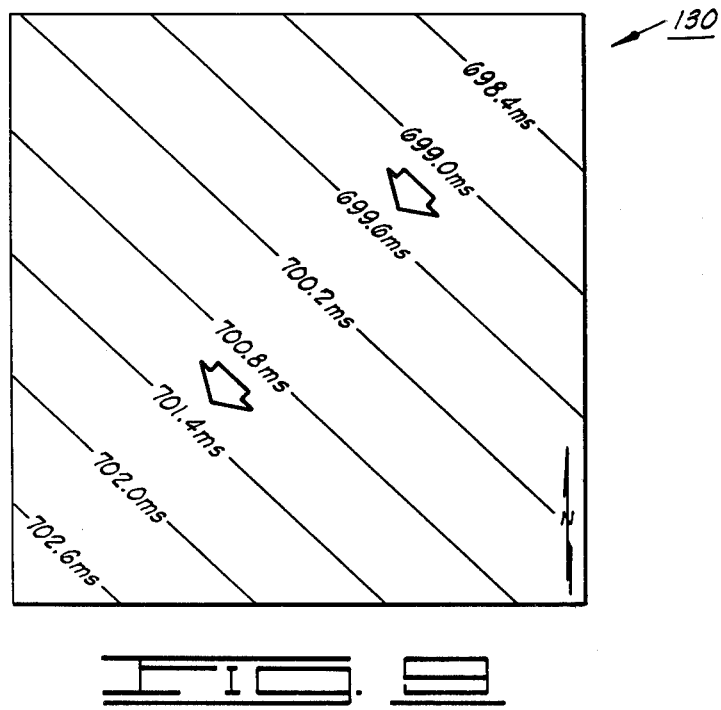
DIP DETERMINED BY SDV
Approx. 50'/Mile S.W. Dip
FIG. 9

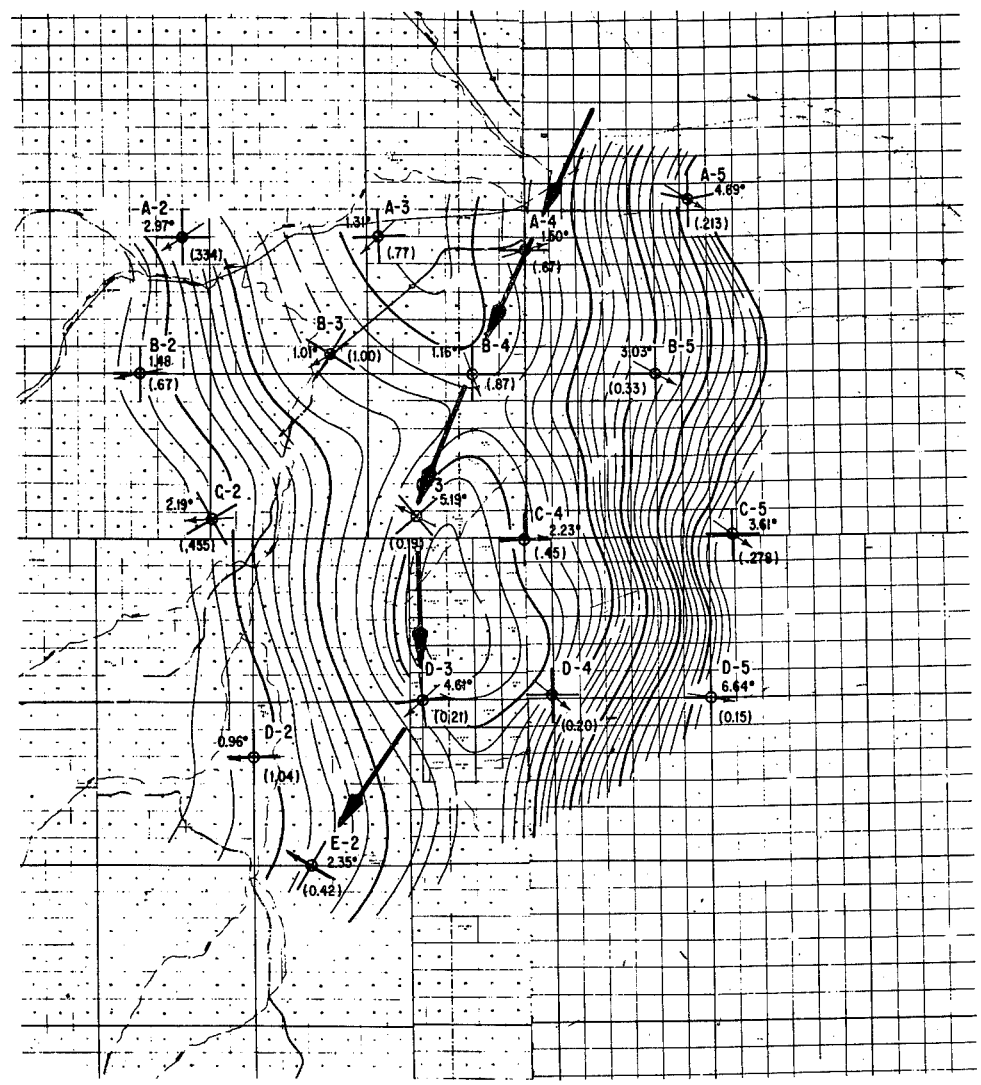
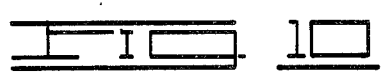

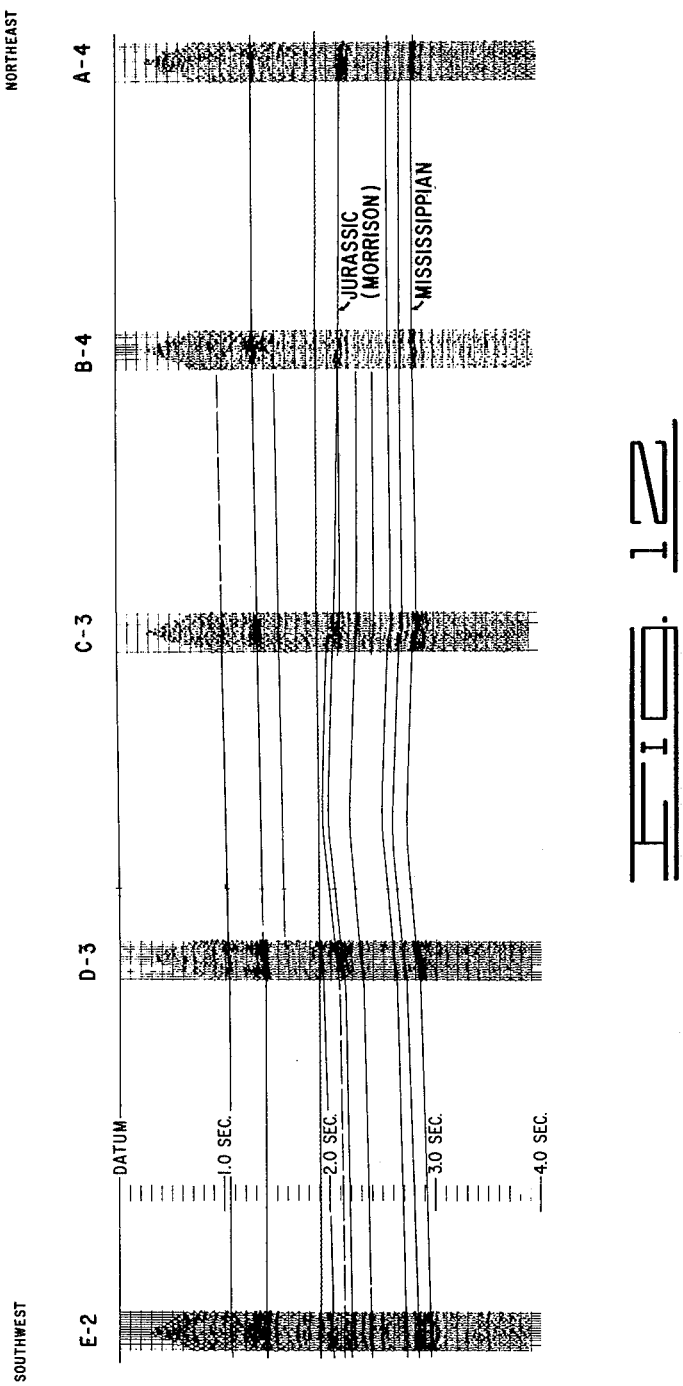

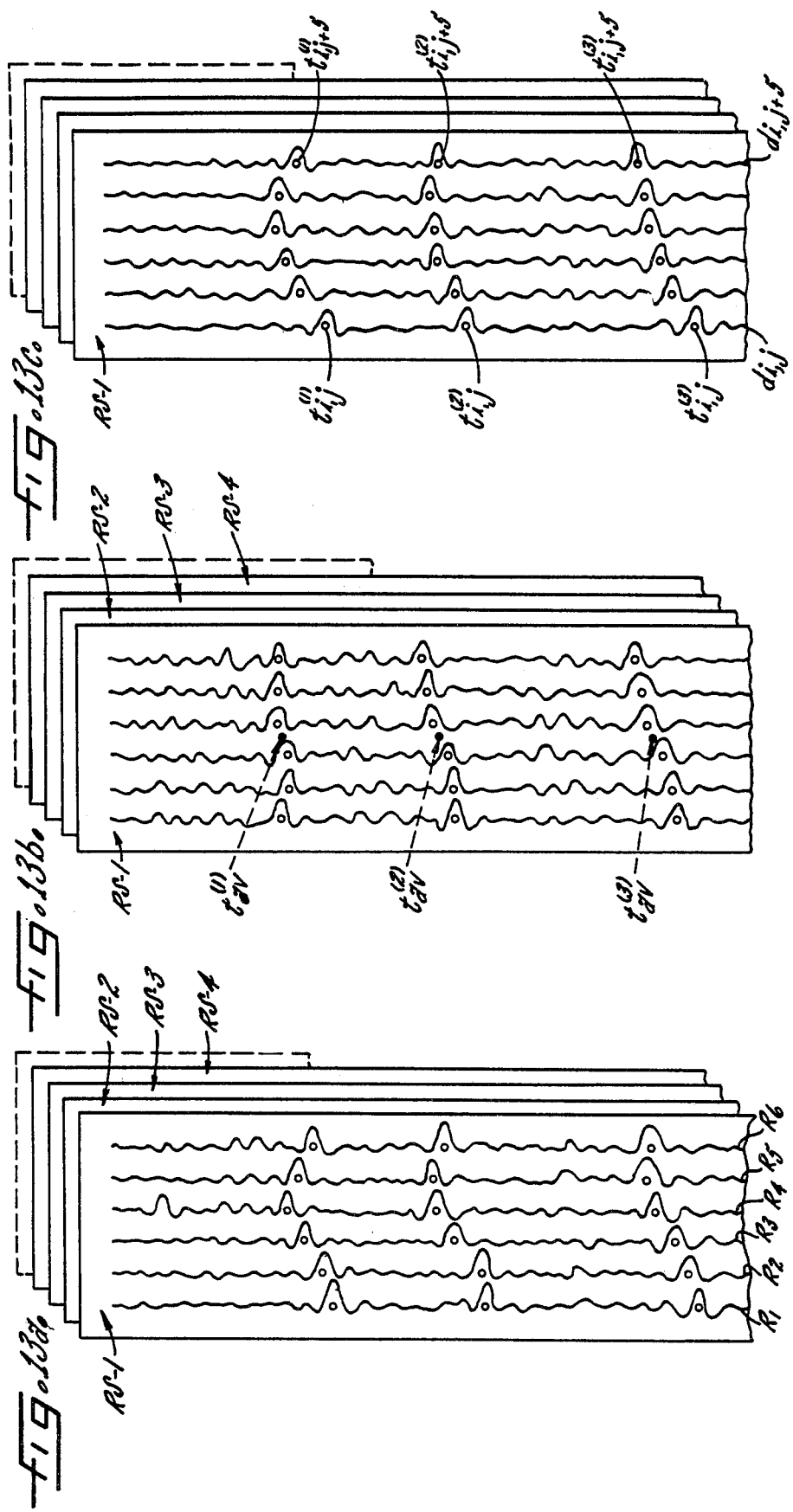

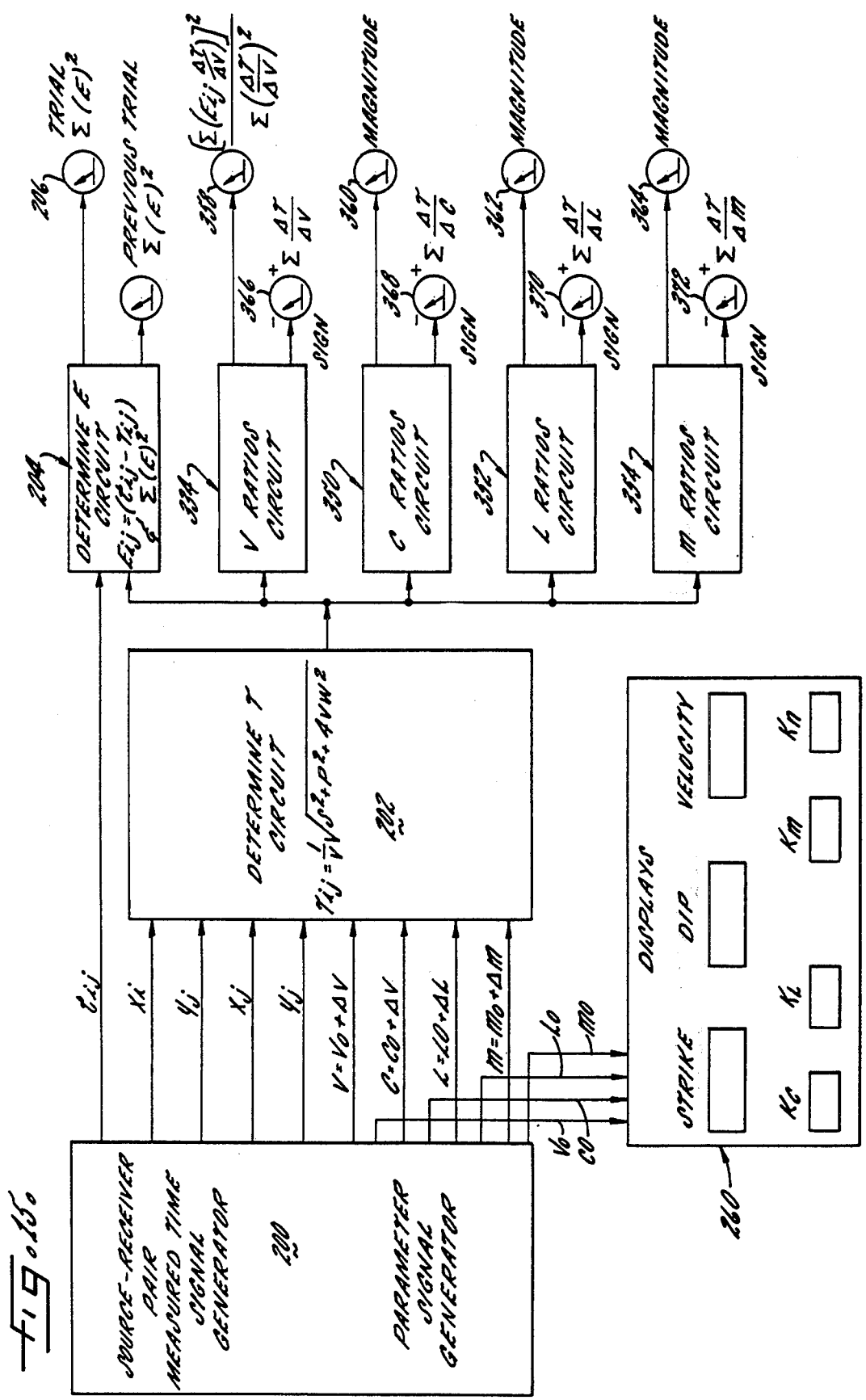

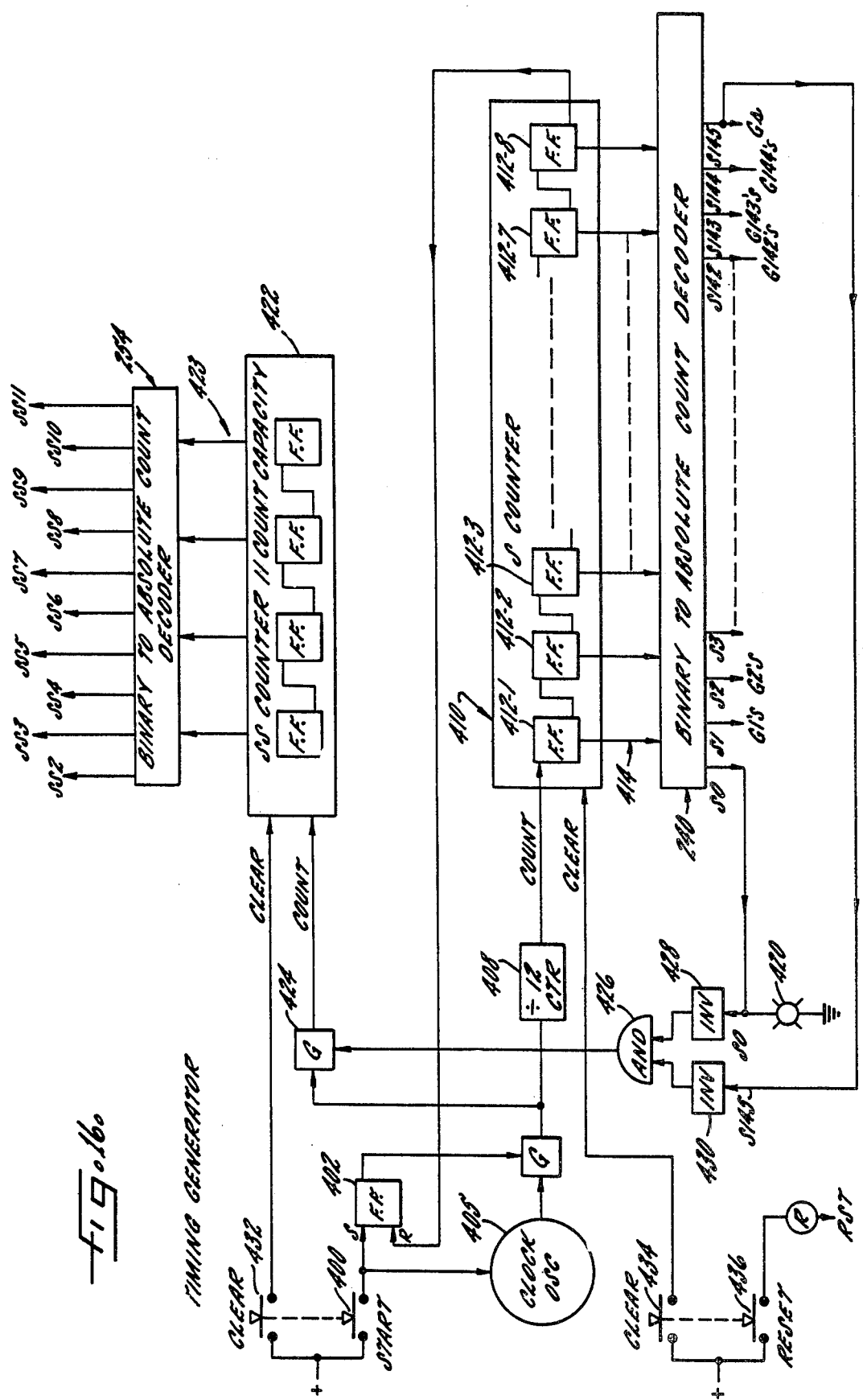

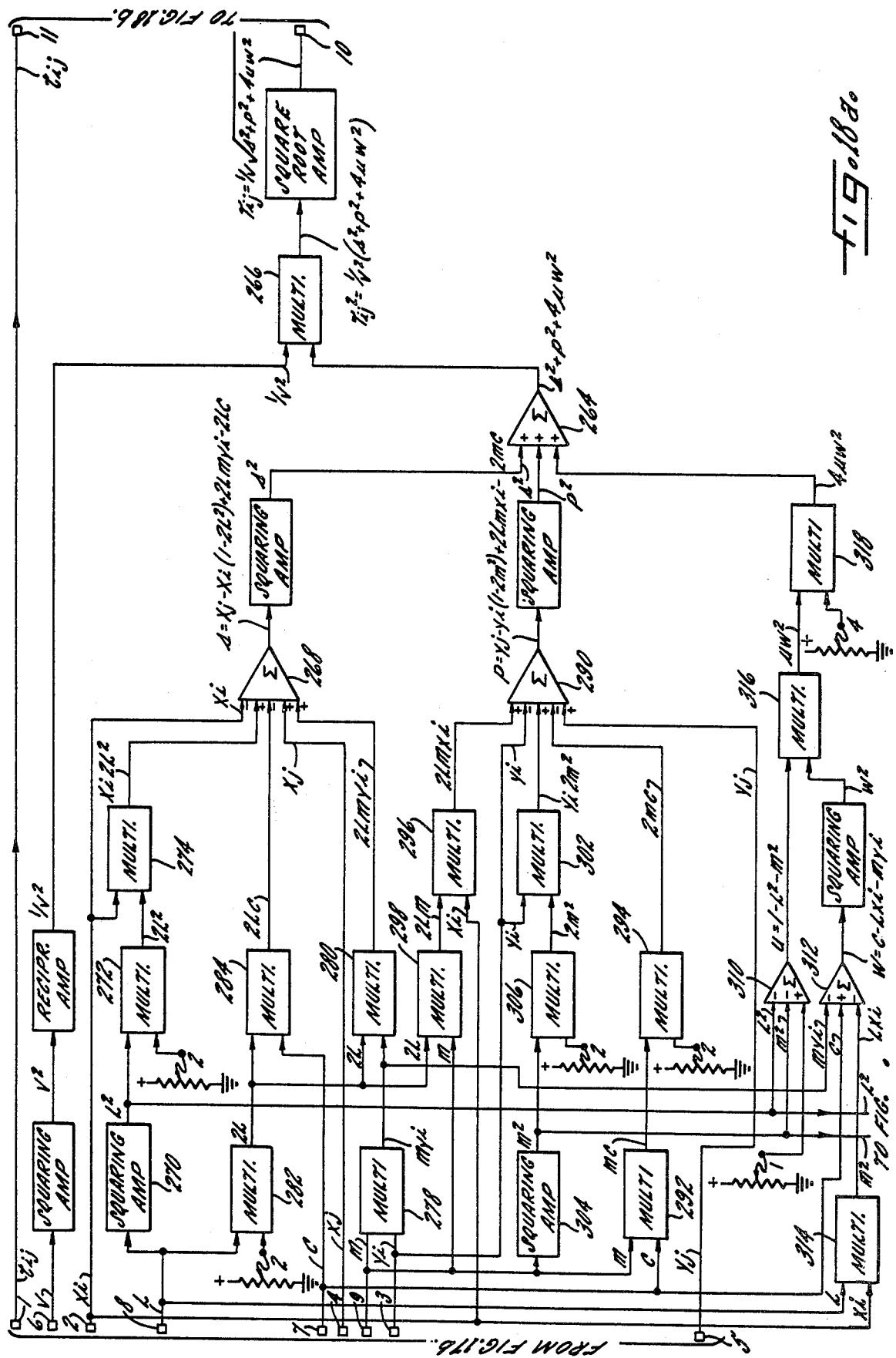

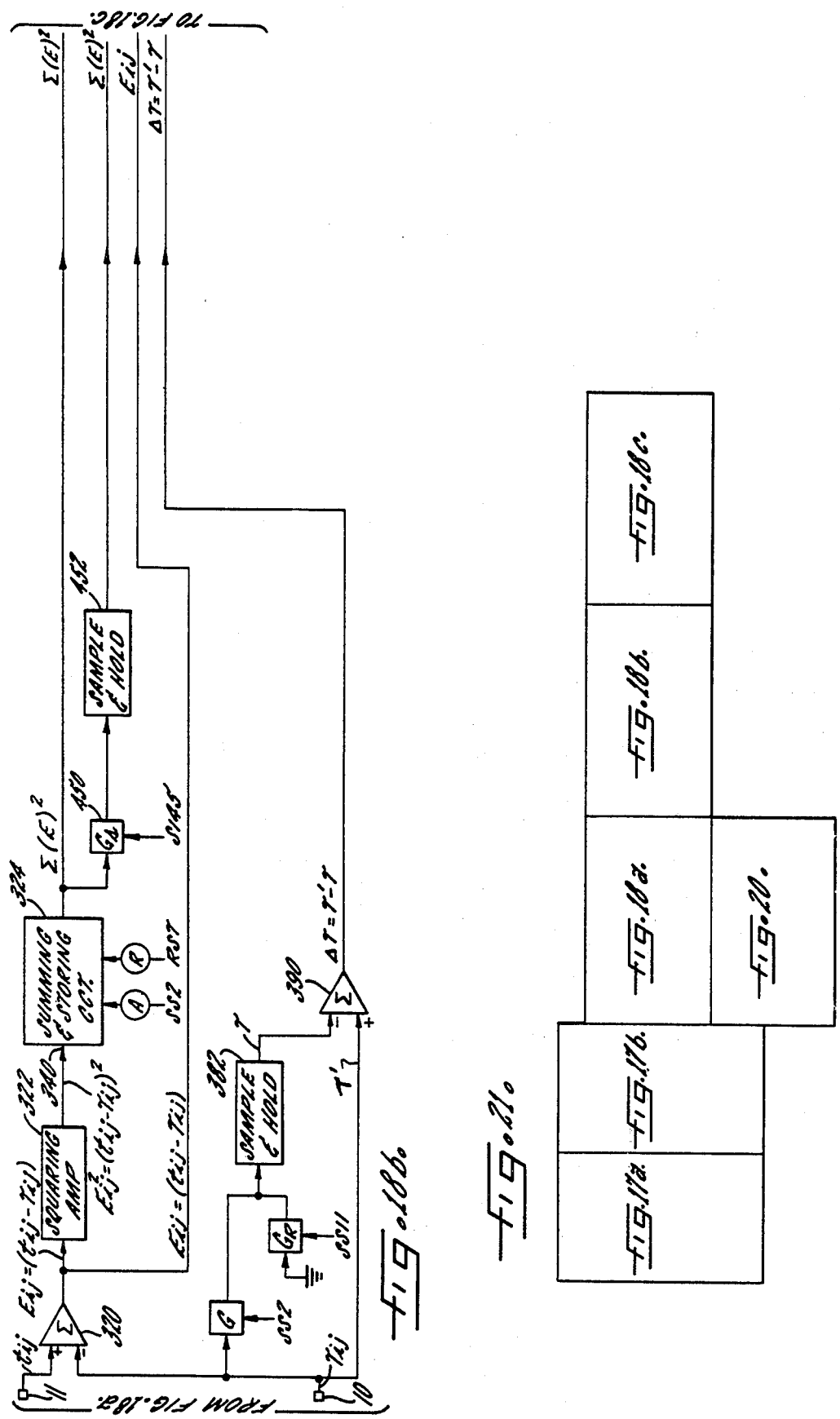

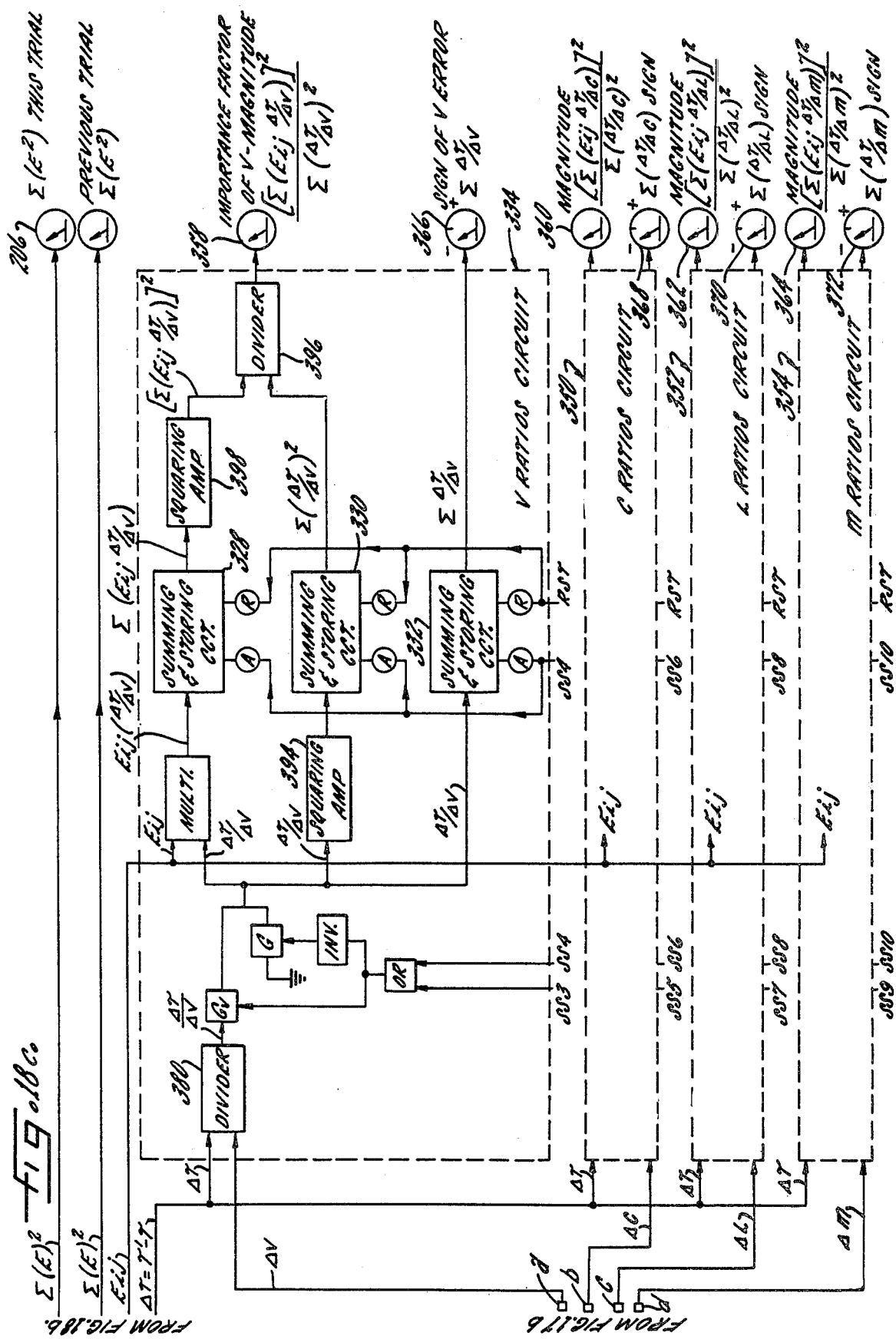

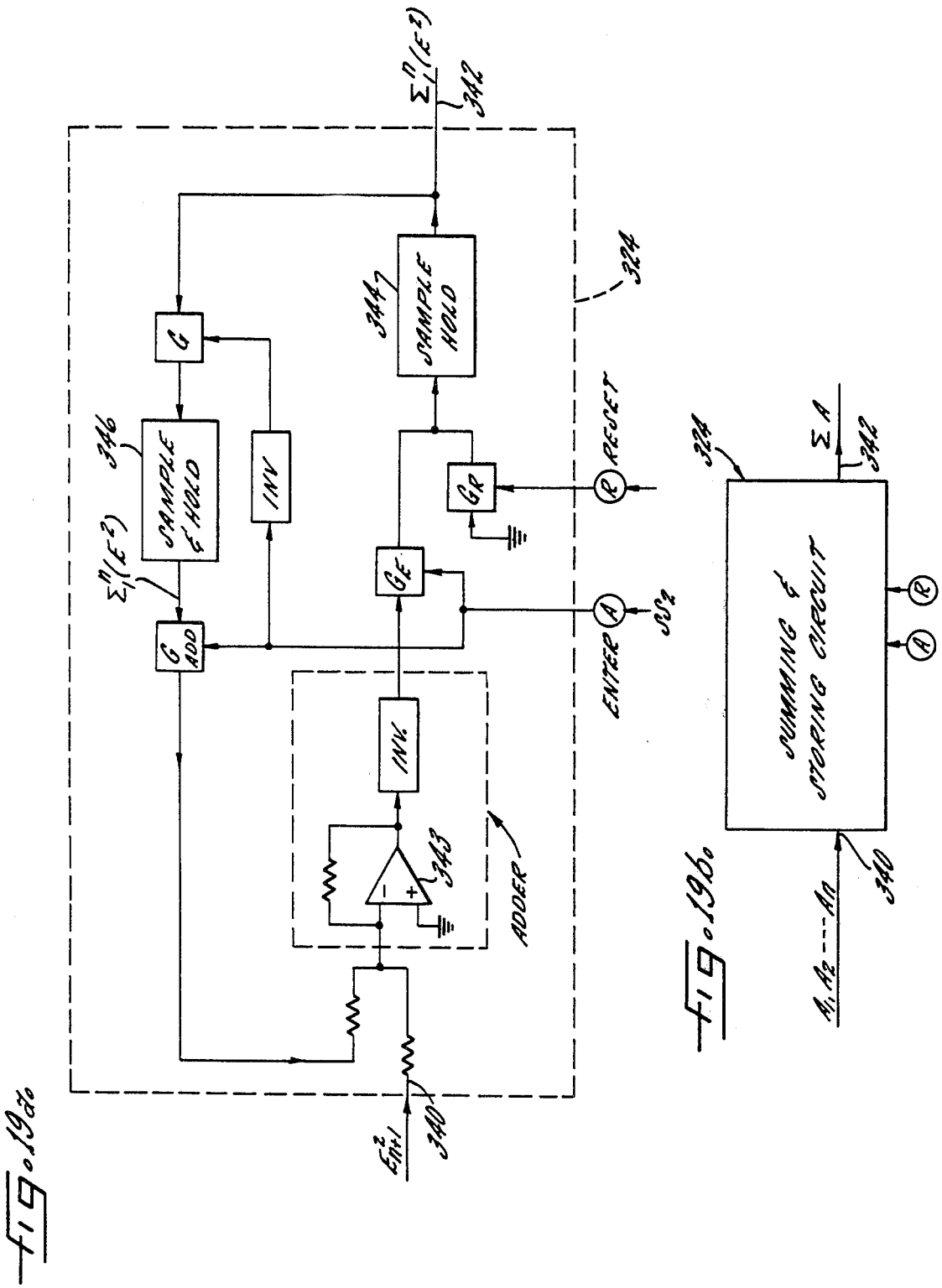

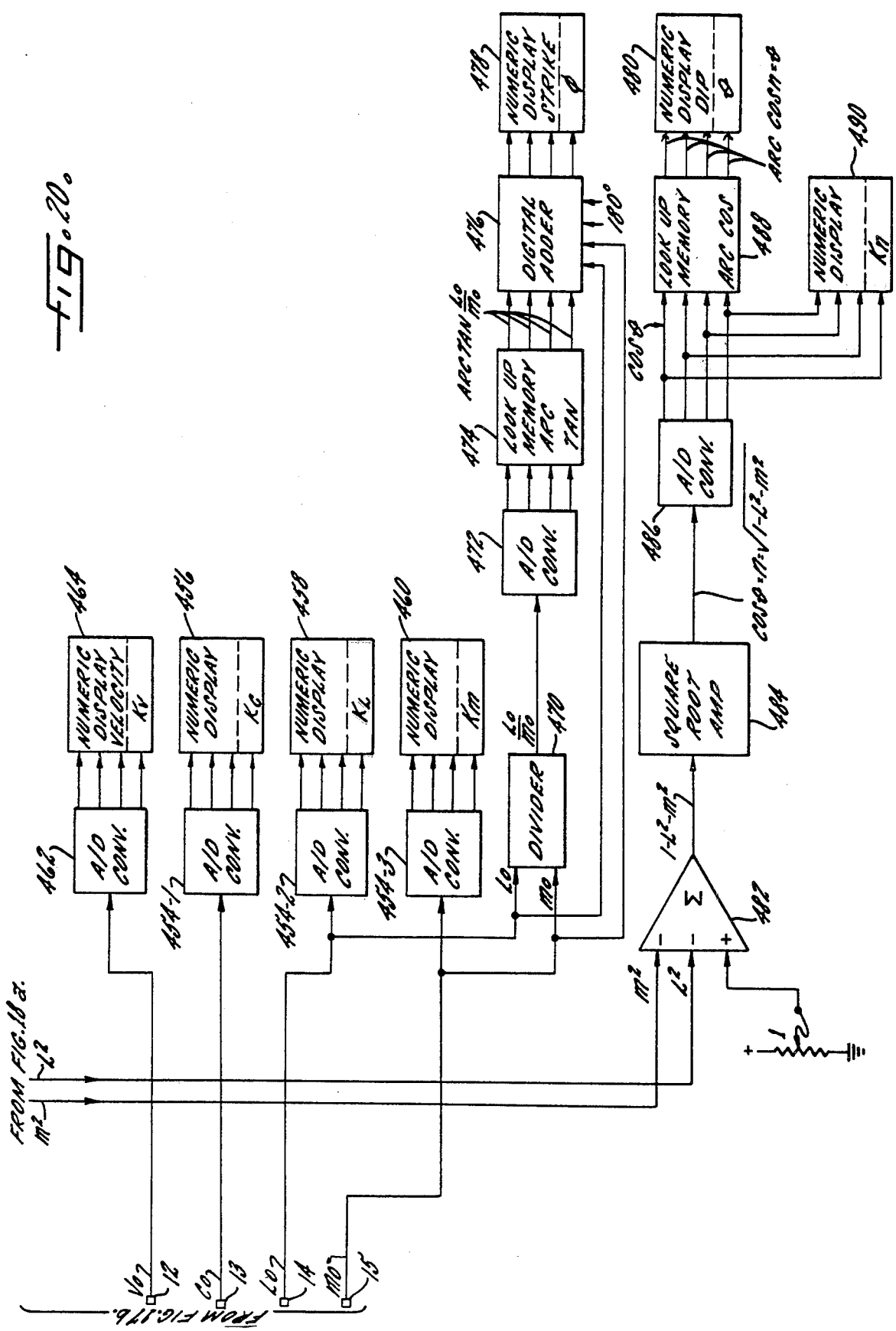

METHOD FOR RECONNAISSANCE GEOPHYSICAL PROSPECTING

CROSS-REFERENCE TO RELATED APPLICATION

This is a continuation-in-part of Kenneth H. Waters et al. Application Ser. No. 174,744, filed Aug. 15, 1971 now abandoned.

BACKGROUND OF THE INVENTION

1. Field of the Invention

The invention relates generally to geophysical prospecting systems and, more particularly, but not by way of limitation, it relates to an improved seismic prospecting system wherein initial test information can be quickly obtained to provide specified reconnaissance data relative to a given area.

2. Description of the Prior Art

The prior art includes many and varied teachings related to types and patterns of seismic source-receiver communications and there are many different types of receiver arrays, source arrays, and groups of such arrays which may be utilized in obtaining seismic information of predetermined content. Most sounding methods require, for best results, that the system consists of a large plurality of successive soundings, or source-reflection-receiver signal indications, compiled for a large number of locations of generally similar symmetry as effected at spaced locations along a predetermined line of survey. It is generally essential to operate along a line of survey in order to compile meaningful data which will then be checked through continuity of characteristics along the survey line. Recent innovations in shot patterns and data processing techniques have seen evolution of the crossed source-geophone pattern for determination of specific data, and a teaching of particular interest with respect to such information is U.S. Pat. No. 3,529,282 in the name of R. J. S. Brown et al. entitled "Method for Determining In-Line and Cross Dip Employing Cross Steering of Seismic Data" as filed on Jan. 29, 1968. In general, prior art methods are time consuming and better applied for detailing a given area rather than for fast reconnaissance.

SUMMARY OF THE INVENTION

The present invention contemplates a seismic energy prospecting method wherein a predetermined crossed source-geophone pattern is utilized to obtain quadrature arrayed seismic return information for further processing to determine strike, dip, velocity and interactive parameters. In a more limited aspect, the invention consists of the use of sounding patterns wherein a plurality of sources and a plurality of receivers or geophones are arranged in respective lines and at essentially right angles one to the other, whereupon repeated shot or impulse data is processed across diagonal reaches of the cross patterns, i.e. the hypotenuse extent of the quadrants, to record data at strata within the respective quadrant. Data derived for each of the quadrants is then uniformly related with respect to the overall cross pattern and the center point thereof such that the data can be effectively processed relative to selected strata to indicate the desired strike, dip, velocity, etc. (SDV) information. The invention provides an accurate reconnaissance method which can be effected in a very short time over a large area to provide valuable initial information relative to the strike, dip and velocity information, such information then being utilized to plan the further sounding technique or to control the decision as to further exploration.

Therefore, it is an object of the present invention to provide a reconnaissance method of geophysical prospecting wherein pertinent data can be quickly derived for a large area.

It is also an object of the invention to provide a seismic sounding method which enables more specific data relative to selected strata within the earth.

It is yet another object of the present invention to provide a method for obtaining desired data for a large land area with a minimum of time and crew expense.

Finally, it is an object of the present invention to provide a geophysical prospecting method which enables initial assembly of strike, dip and average or interval velocity for preselected strata of a large land area without the requirement of continuous sounding information along a survey line.

Other objects and advantages of the present invention will be evident from the following detailed description when read in conjunction with the accompanying drawings which illustrate the invention.

BRIEF DESCRIPTION OF THE DRAWINGS

FIG. 1 is a plan diagram of a source-receiver arrangement as employed in accordance with the present invention;

FIG. 2 is a depiction of a three-dimensional model illustrating acoustic energy signal paths as carried out in accordance with the present invention;

FIG. 4 is a diagram illustrating the geometrical relationship of the data parameters utilized in the processing of the present invention;

FIG. 5 is a flow diagram of the data processing program as carried out in the present invention;

FIG. 6 illustrates one form of output which may be utilized in the present invention;

FIG. 9 represents an output diagram illustrating dip and depth as derived from the time corrected output pattern of FIG. 8;

FIG. 10 is an actual exploration map of a large land area wherein a plurality of crossed source-receiver arrays have been placed at selected locations for purposes of obtaining a reconnaissance data output;

FIG. 12 illustrates a profile of data traces as taken along the survey line indicated by the heavy arrows in FIG. 10;

FIGS. 13a, 13b and 13c represent sheaves of records of field recorded trace data;

FIG. 14 represents a partial tabulation of data obtained from the original trace data of FIGS. 13a–13c and receiver-source location data;

FIG. 15 is a block diagram of an analog system for carrying out the present invention;

FIG. 16 is a schematic circuit of a timing generator circuit included in the analog system;

FIGS. 17a and 17b taken together represent a schematic circuit diagram of a source-receiver pair measured time signal generator and parameter signal generator included in the analog system;

FIG. 18a is a schematic circuit diagram of a determine T circuit included in the analog system;

FIGS. 18b and 18c taken together are a schematic circuit diagram of a determine E circuit and V, c, L, m ratios circuits included in the analog system;

FIGS. 19a and 19b are a schematic circuit diagram and a block diagram, respectively, of summing and storing circuitry utilized in the analog system; and FIG. 20 is a block diagram of the display portion of the analog system.

FIG. 21 shows the relation of several figures.

DETAILED DESCRIPTION OF THE INVENTION

Figure 3:
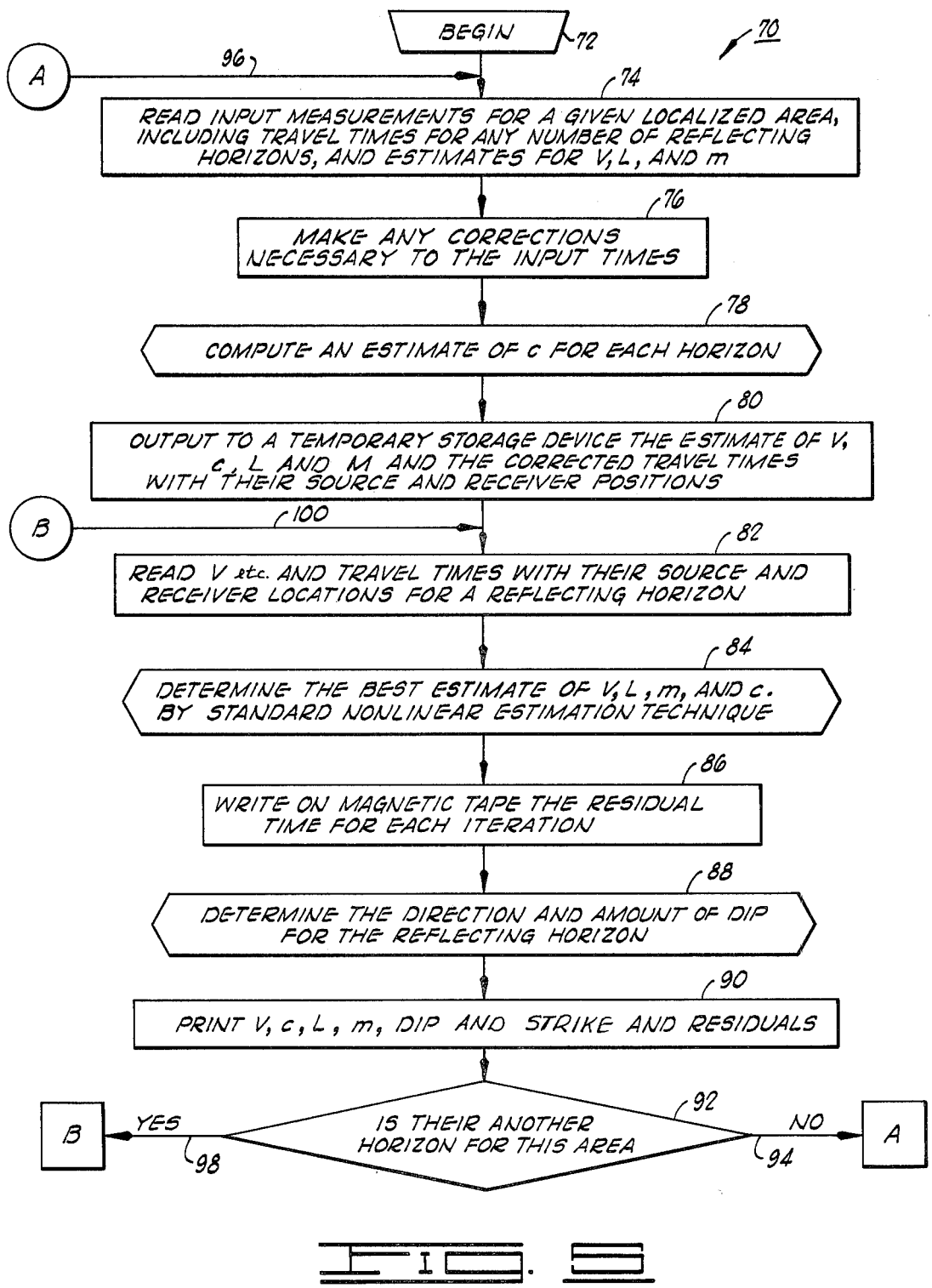
FIG. 3 is a plan diagram of individual source and receiver geophone arrays as may be utilized in the present invention.

The reconnaissance prospecting method of the present invention may be effected by utilizing such as a crossed sounding pattern 10 as shown in FIG. 1. The crossed sounding pattern 10 consists of a plurality of sources $S_1-S_{12}$ as placed in equi-spaced manner along a source line 12 and, in crossed relationship, at generally right angles, a plurality of receivers $R_1-R_{12}$ are placed in identical or highly similar spacing along a receiver line 14. Generally straight line, single reflection signal energy will provide information within a pattern of reflection points which is controlled in processing to define a square or rectangular array such as reflection pattern ABCD or pattern 16 which results from seismic energy emanating from sources $S_7-S_{12}$ for detection by receivers $R_7-R_{12}$. In like manner, reflection patterns 18, 20 and 22 in each of the remaining quadrants of shot pattern 10 are outlined in similar manner by primary reflections as effected across the diagonal between the ends of respective source line 12 and receiver line 14. Thus, energy emanating from sources $S_7-S_{12}$ will outline a reflection point pattern 22 simultaneous with outlining of pattern 16 as receivers $R_1-R_6$ also detect returned seismic energy from that subterranean plane. Initiation of impulse energy from sources $S_1-S_6$ will then serve to provide event information outlining the respective reflection point patterns 18 and 20, which energy is detected at the receivers $R_7-R_{12}$ and $R_1-R_6$, respectively.

FIG. 2 illustrates in simplified form the manner in which the cross pattern of seismic sources and receivers is utilized to outline the afore-cited reflection point patterns at some subterranean level or lithological stratum. Thus, the receiver cross pattern is laid out on the surface 24 about a center point 26 along cross lines 26 and 30. The receivers $R_1-R_6$ are spaced across line 28 while the sources $S_1-S_6$ lie along cross line 30. The sounding and subsequent processing take place then with respect to a stratum 32 which would hold particular significance with respect to the information quest, and the reflection point patterns 34, 36, 38 and 40 would constitute a generally rectangular quadrature array of reflection points at stratum 32. The energy emanating from seismic source $S_1$ would travel along the ray paths as indicated for reflection at the first row 42 of reflection points in each of patterns 38 and 40 whereupon that information would be returned to the receivers $R_1-R_6$ across line 28. Subsequently, source $S_2$ would be excited to propagate seismic energy which would reflect from reflection points in row 44 for return to receivers $R_1-R_6$, and still additional source-receiver circuits would tend to complete the reflection information for the reflection point patterns 38 and 40.

Obtaining information for the two remaining reflection point patterns 36 and 34 of the quadrature array would be effected in the same manner. That is, excitation of source $S_6$ would provide reflection data for reflection points of row 46 in patterns 34 and 36 while subsequent excitation of sources $S_5$, $S_4$, etc. would provide progressive reflection point information to fill out the pattern data. In each case, the source energy is transmitted diagonally across and between extremities of the array lines. This is shown to good advantage in FIG. 1 wherein the reflection point pattern 16 is formed by energy from sources $S_7-S_{12}$ as received by receivers $R_7-R_{12}$. In this case, energy emanating from seismic source $S_7$ would reflect from each of the reflection points in row 48 of the reflection point pattern 16. Similarly, and upon successive impulse initiations, energy from source $S_8$ would provide reflection energy for row 50, $S_9$ from row 52, etc. until all rows of the reflection point pattern 16 are filled out and recorded from receivers $R_7-R_{12}$ for use in subsequent processing and evaluation.

The sources $S_1-S_{12}$ are located along source line 12 which is preferentially, but not necessarily, at right angles to the receiver line 14. When at all possible the right angular alignment should be adhered to; however, in the event that terrain limitations will not permit, alignment and array adjustments can be made at the surface, and the subsequent computation and data processing can be regulated to allow for variations. It may be necessary or desirable to leave the near center positions of both source line 12 and receiver line 14 vacant. That is, those source and receiver positions near the center of the cross are not utilized due to the fact that certain inherent interference energy will pose particular problems. Thus, while both impulsive sources and vibrational sources may be employed, surface scattering effects may dictate that a relatively long reflection path be employed. This will be especially true when using the vibrational systems as it is necessary to provide patterns of receivers and sources in which the surface and near surface waves are considerably reduced in amplitude, and this is more nearly achieved by omitting the cross-center positions.

Under such conditions where the center positions are offset it may then be desirable to lay out at each receiver position a straight line pattern along the receiver line which is made longer than normal. As shown in FIG. 3, the receiver line 14 utilizes a straight line geophone array at each receiver position of positions $R_7-R_{12}$. This provides, effectively, a direct view of incoming energy relative to the outer or end positions of source line 12, i.e. sources $S_1-S_6$ and $S_7-S_{12}$, since the near offset sources and receivers with restricted angle of incidence are eliminated such that a sufficiently long component of the geophone group will then be available at each receiver position. The vibrator patterns may also be correspondingly increased in length, but all will lie along the source line 12. It should be noted too that for those combinations for which the linear source pattern will be effective, the linear receiver pattern will be relatively ineffective and vice versa. The determination of proper receiver and source pattern configurations will be determined by tests in the field in the usual manner.

For flat reflecting horizons or selected subterranean strata the reflections coming from a set of sources along one-half of a cross pattern and recorded along one-half of the receivers of the cross pattern will occupy plan positions as shown in the rectangular pattern 16 of reflection points outlined .ABCD. With a cross pattern of seismic sources and receivers, reflection patterns will occupy plan positions in all four quadrants as shown in FIG. 1 wherein the other three quadrantal related reflection point patterns 18, 20 and 22 are apparent. Then, for a planar but non-horizontal reflecting stratum, the rectangular patterns will be shifted to accommodate the fact that the ray path plane is no longer vertical. All four rectangular patterns 16–22 will shift in the same direction by a like amount which shift has no effect on the computational system to determine the final output findings.

As shown in FIG. 1, the depth point C of reflection point pattern 16 results from energy traveling from source $S_{12}$ to receiver $R_{12}$ and this is a relatively long offset compared with the ray path defining point A which is defined by energy from source $S_7$ traveling to reflector $R_7$. Therefore, the time of arrival of a given reflection on these two traces will be greatly different due to the normal moveout even if the reflecting plane or stratum is horizontal. Similar time differences of different amounts, this depending upon offset difference, will occur for all points within the rectangle ABCD or reflection point pattern 16. It will follow too that the remaining quadrature arrayed rectangular patterns 18, 20 and 22 will be similarly formed relative to the selected subterranean stratum, and the diagonal travel times and offset relationships of the various seismic energy traces will be comparable for each of the four diagonal shot patterns.

For a normal field lay out, from ten to twenty source units and ten to twenty geophone arrays may be used with the total difference from end to end on the order of 1.5 to 3 miles. It can be noted then that, if the distance from end to end were 2 miles, the area covered by the reflection points would be 1 square mile at all reflecting horizons. This ratio may be slightly affected by departures of the reflecting horizons from horizontal.

The method of the present invention may be carried out utilizing standard seismic field equipment arranged in cross-patterns of seismic sources and receivers to obtain the measurements of travel times of seismic energy between source-receiver pairs and the reflecting horizon in the specified area of exploration. Data processing may be carried out either by analogue equipment or by digital processing systems and the programmed digital computation system has proven to be the most efficient manner of processing the related seismic data, such program to be further discussed below.

In accordance with the method of this invention, input data to the data processing system will include representations t of measured travel times of seismic energy from source to reflecting stratum to receiver for at least four independent paths between sources and receivers and preferably more for increased reliability of the results. Such measured travel times are provided by the conventional seismic equipment arranged in the cross patterns of sources and receivers as explained above. Also, input data will include data as to the actual locations of the source-receiver pairs used for collecting the measured time travel data.

In carrying out the method of this invention, with the use of data processing equipment, signals t representing the measured travel times are compared with signals T representing determined travel times of seismic energy to an estimated reflecting plane. It can be seen that if there is no variance or "difference" between the measured travel times and the determined travel times to an estimated plane for a plurality of source-receiver pairs, the estimated reflecting plane will represent directly the configuration of the underlying stratum selected for analysis. In the method of this invention, with the use of the data processing equipment, such an estimated reflecting plane is established and the signals t representing measured travel times compared with signals representing determined travel times T for all source-receiver pairs of a cross pattern. The variance or difference is obtained, and the estimated reflecting plane is changed and a new determination made of the difference, with the cycle being repeated after each change of the estimated reflecting plane until the best fit to the measured travel times is obtained. The attitude and azimuth of the best fit plane provides the strike and dip of the selected underlying earth stratum, and since in this method velocity of seismic energy is utilized as one of the parameters in determining the travel times to the estimated plane, the velocity used in making the best fit determination provides the actual velocity of seismic energy in the earth layers between the surface and the selected underlying stratum.

The quantity c is the perpendicular distance from a selected origin (designated "0" in FIG. 4) to the reflecting plane (labeled REFLECTING HORIZON in FIg. 4). The quantities L and m are direction cosines of the perpendicular line c relative to the X and Y axis respectively. To depict these direction cosines in FIG. 4, the angle between the perpendicular line c and the X and Y axis are designated $\alpha$ and $\beta$, respectively and, thus, cos $\alpha$ = L and cos $\beta$ = m as shown on this Figure. The angle between the perpendicular line c and the Z axis is designated as in FIG. 4, and the quantity n, the direction cosine, equals cos $\theta$, as shown. The relation between L, m and n will equate as:

$$L^2 + m^2 + n^2 = 1 \tag{1}$$

The equation of the plane is:

$$Lx + my + nz = c \tag{2}$$

where c is the perpendicular distance of the plane from the origin O.

While the length of the line c cannot be directly measured, its length may be estimated from the recorded data which reveals the travel times of seismic energy between sources S and receivers R, and from the velocity V of seismic energy traveling through the earth between the surface and the reflecting plane being analyzed, which velocity V may also be estimated.

Also shown in FIG. 4, are the additional geometric relationships for a ray path denoted as $Q_i$ which extends from the source position $P_j(x_j, y_j, 0)$ and the receiver position $P_i(x_i, y_i, 0)$. The image point of the source $P_j$ is the point $I_{ij}$, and the reflection point on the reflecting horizon 60 is $R_{ij}$. Thus, the reflection path from $P_j$ to $R_{ij}$ to $P_i$ is the same as the distance $I_{ij}$ to $P_i$ where $I_{ij}$ is the image of $P_j$ in the given plane. Then, it will follow that:

$$D^2_{ij} = [x_j - x_i(1 - 2L^2) + 2Lmy_i - 2L_c]^2 + [y_j - y_i(1 - 2m^2) + 2Lmx_i - 2mc]^2 + [2nc - 2Lnx_i - 2nmy_i]^2 \tag{3}$$

where D is equal to the distance from source to reflector to receiver.

Letting K equal $(1/V)^2$ and $n^2$ equal the quantity $(1-L^2-m^2)$, where V equals velocity and T is equal to energy travel time, then the relation holds as $$T^2_{ij}=K\{[x_j-x_i(1-2L^2)+2Lmy_i-2Lc]^2+ [y_j-y_i(1-2m^2)+2Lmx_i-2mc]^2+4(1-L^2-m^2)[c-Lx_i-my_i]^2\} \quad (4)$$

In processing the data to obtain the best fit of an estimated reflecting plane to the measured travel times, it is preferred to utilize a non-linear estimation technique known as the method of least squares, where the variance or difference between the measured travel times t and the determined travel times T to the estimated reflecting plane, is squared. The parameters L, V, m and c are then determined for the case where the sum of the squares of the variance is a minimum for all source-receiver pairs of a cross pattern, represented by the expression:

$$\Sigma_{ij}(t_{ij}-T_{ij})^2 \quad (5)$$

where i and j are conventional subscripts designating all the sources and receivers, which indices i and j are completely interchangeable, $T_{ij}$ are the determined travel times and $t_{ij}$ are the measured travel times.

Since it is necessary to estimate four independent parameters, it is necessary that at least four independent paths to the plane be measured in order to obtain a solution. For added statistical error cancellation, it is recommended that several more paths on the order of at least ten also be measured and utilized. By knowing the source and receiver locations, and the measured travel time for all paths, L, m, n, c and V can be estimated. As these parameters vary non-linearly, standard non-linear estimation techniques must be utilized in formulating the estimated values. Thus, it is suggested to use techniques such as those described in "BMD, Biomedical Computer Programs, X-Series Supplement", techniques which utilize step-wise Gauss-Newton iterations, such procedures being well documented in the statistical literature since about 1960. For convenience in reference, portions are reproduced below of certain sections from said BMD publication, specifically the sections entitled "General Description", "Card Preparation d. Fortran Statements", and "Computational Procedure Step 1 and Step 2".

---

"BMDX85
NONLINEAR LEAST SQUARES

"1. GENERAL DESCRIPTION

"a. This program obtains a weighted least squares fit
$$y = f(x_1, \ldots, x_t; \theta_1, \ldots, \theta_p) + e$$
of a user specified function f to data values $x_1, \ldots, x_t$, y by means of a stepwise Gauss-Newton iterations on the parameters $\theta_1, \ldots, \theta_p$. Within each iteration parameters are selected for modification in a stepwise manner. The parameter selected at a given step is the one which, differentially at least, makes the greatest reduction in the error sum of squares. If necessary to avoid singularity problems, only a subset of the parameters may be modified in a given iteration. In addition, parameters with boundary values whose modification in a given iteration would lead to boundary violations are not modified. In effect the iteration is performed "on the boundary" when it appears that the best fit occurs outside the parameter range.

"b. Output from this program includes:
(1) Parameter values and residual mean square after each iteration
(2) Asymptotic deviations and correlations for the estimated parameters after the last iteration
(3) For each case after the last iteration
  (a) Original data
  (b) Value of the function
  (c) Residual
  (d) Standard deviation of the predicted y "c. Limitations per problem
(1) Total amount of data, $n(t + 1) \leq 15{,}000$
(2) Number of parameters, $p \leq 100$
(3) Number of Variable Format Cards, $f \leq 9$
where n is the number of cases and t is the number of independent variables.

"d. Estimated running time and output pages per problem:
Running time id largely dependent on the function being fitted. For reasonably uncomplicated models and a few hundred cases, an estimate of five minutes should be sufficient. (IBM 7094)
Number of pages: $20 + n/60$.

"3. CARD PREPARATION
Preparation of the cards listed below is specific for this program. All other cards listed in the preceding section are prepared according to instructions in the Introduction.

"d. FORTRAN Statements
These are compiled by the FORTRAN IV compiler and are executed n times for each iteration. They must define a function, f, and its derivatives, $d_1$, with respect to its parameters, $p_i$. The dependent, independent and weight variables may be altered in these statements.
Example:
Suppose the model is $x_1 = p_1 \sin(p_2 x_2) + p_3 + e$ where $x_1$ and $x_2$ are data values and $p_1, p_2, p_3$ are parameter values. Then
$$f = p_1 \sin(p_2 x_2) + p_3$$
$$d_1 = \sin(p_2 x_2)$$
$$d_2 = p_2 x_2 \cos(p_2 x_2)$$
$$d_3 = 1$$
and the FORTRAN statements are:
F=P(1)*SIN(P(2)*X(2))+P(3)
D(1)=SIN(P(2)*X(2))
D(2)=P(1)*X(2)*COS(P(2)*X(2))
D(3)=1.0
For any model, the last two cards should be RETURN and END.

"4. COMPUTATIONAL PROCEDURE
For ease of description we denote the dependent variable as $y_i$, the weights by $w_i$, and assume the independent variables to have indices 1 to t. Beginning with an initial set of parameter values $\theta = (\theta_1, \ldots, \theta_p)$ specified by the user, the program minimizes the error mean square $$s^2 = \frac{1}{n-p} \sum_{i=1}^{n} [(y_i - f(x_{i1}, \ldots, x_{it}; \theta_1, \ldots, \theta_p))^2 \cdot w_i]$$

by means of stepwise Gauss-Newton iterations. The function f and its partial derivatives $f_j = \partial f/\partial \theta_j$ are evaluated by means of a user supplied subprogram (see Section 3, d.)

"Step 1. Let $d = p + 1$ and let $x_i = (x_{i1}, \ldots, x_{it})$ and
$z_{ij} = f_j(x_i, \theta)$, $i = 1, \ldots n$; $j = 1, \ldots, p$
$z_{id} = y_i - f(x_i, \theta)$, $i = 1, \ldots n$.
The matrix
$$a_{ij} = \sum_{k=1}^{n} z_{ki}z_{kj}w_k, \ i,j = 1, \ldots, d$$
is formed and the error mean square $s^2 =: a_{dd}/(n-p)$ is computed "Step 2. The diagonal elements of ($a_{ij}$) are pivoted on in a stepwise manner. At each step the index k of the pivot element is the one which maximizes $a_{kd}^2/a_{kk}$ among all k satisfying
(1) $0 < k \leq p$ and k has not been used previously as a pivot index.
(2) $a_{kk}/\tilde{a}_{kk} > T$ where T is the tolerance specified by the user and $\tilde{a}_{kk}$ is the value of $a_{kk}$ before pivoting began.
If the tolerance drops too low, some diagonal elements (in addition to $a_{dd}$) may not be used as pivots."

Utilization of this technique will require as stated in the "General Description" section of the BMD publication reproduced above, that the function (4) which is the user specified function f, and the partial derivatives of the function with respct to each parameter be defined. Thus, the partial derivatives above-mentioned may be defined as follows:

$$\frac{\partial T_{ij}}{\partial V} = \frac{-1}{V^2} \{[x_j - x_i(1 - 2L^2) + 2Lmy_i - 2Lc]^2 + \qquad (6)$$
$$[y_j - y_i(1 - 2m^2) + 2Lmx_i - 2mc]^2 +$$
$$4(1 - L^2 - m^2)[c - Lx_i - my_i]^2\}^{\frac{1}{2}}$$

$$\frac{\partial T_{ij}}{\partial L} = \frac{4}{V} \{(x_j - x_i(1 - 2L^2) + 2Lmy_i - 2Lc) \qquad (7)$$
$$(2Lx_i + my_i - c) + mx_1(y_j - y_i(1 - 2m^2) + 2Lmx_i - 2mc) -$$
$$2x_i(1 - L^2 - m^2)(c - Lx_i - my_i - 2L(c - Lx_i - my_i)^2\}$$
$$\{2[(x_j - x_i(1 - 2L^2) + 2Lmy_i - 2Lc)^2 + (y_j - y_i(1 - 2m^2) +$$
$$2Lmx_i - 2mc)^2 + 4(1 - L^2 - m^2)(c - Lx_i - my_i)^2]^{\frac{1}{2}}\}^{-1}$$

$$\frac{\partial T_{ij}}{\partial m} = \frac{4}{V} \{Ly_i(x_j - x_i(1 - 2L^2) + 2Lmy_i - 2Lc) \qquad (8)$$
$$(y_j - y_i(1 - 2m^2) + 2Lmx_i - 2mc)(2my_i + Lx_1 - c) -$$
$$2y_i(1 - L^2 - m^2)(c - Lx_i - my_i) - 2m(c - Lx_i - my_i)^2\}$$
$$\{2(x_j - x_i(1 - 2L^2) + 2Lmy_i - 2Lc)^2 + (y_j - y_i(1 - 2L^2) +$$
$$2Lmx_i - 2mc)^2 + 4(1 - L^2 - m^2)(c - Lx_i - my_i)^2]^{\frac{1}{2}}\}^{-1}$$

$$\frac{\partial T_{ij}}{\partial c} = \frac{4}{V} \{L(x_j - x_i(1 - 2L^2) + 2Lmy_i - 2Lc) + \qquad (9)$$
$$m(y_j - y_i(1 - 2m^2) + 2Lmx_i - 2mc) - 2(1 - L^2 - m^2)$$
$$(c - Lx_i - my_i)\} \{2[(x_j - x_i(1 - 2L^2) + 2Lmy_i - 2Lc)^2 +$$
$$(y_j - y_i(1 - 2m^2) + 2Lmx_i - 2mc)^2 +$$
$$4(1 - L^2 - m^2)(c - Lx_i - my_i)^2]^{\frac{1}{2}}\}^{-1}$$

According to the "Computational Procedure" section of said BMD publication reproduced above, in Step 1 a matrix $a_{ij}$ is formed. Applied to the present method, using the symbols L, c, m and V for the various parameters, T for determined time and E for "error" or the difference (t−T) between measured time t and determined time T for the Case i, the matrix $a_{ij}$ is written out in full as:

$$\frac{\left(\Sigma E_i \frac{\partial T_i}{\partial V}\right)^2}{\Sigma \left(\frac{\partial T_i}{\partial V}\right)^2} \qquad (11)$$

$$\frac{\left(\Sigma E_i \frac{\partial T_i}{\partial c}\right)^2}{\Sigma \left(\frac{\partial T_i}{\partial c}\right)^2} \qquad (12)$$

$$\frac{\left(\Sigma E_i \frac{\partial T_i}{\partial L}\right)^2}{\Sigma \left(\frac{\partial T_i}{\partial L}\right)^2} \qquad (13)$$

$$\frac{\left(\Sigma E_i \frac{\partial T_i}{\partial m}\right)^2}{\Sigma \left(\frac{\partial T_i}{\partial m}\right)^2} \qquad (14)$$

which has the largest value. When the parameters V, c, L and m have all been successively readjusted to bring the sum of the error squared, $\Sigma E_i^2$, to a least value or to below a pre-specified tolerance value, the then-established parameter values represent the best fit of Equation (2) to the stratum plane being analyzed and the best estimation of velocity V. The parameter values then yield numerical values of strike and dip of the stratum plane by well known solid geometry relationships.

FIG. 5 illustrates the flow diagram outlining the program which may be utilized for control of digital data processing equipment functioning in accordance with $$\begin{array}{ccccc}
\sum_i \left(\frac{\partial T_i}{\partial V}\right)^2 & \sum_i \left(\frac{\partial T_i}{\partial c} \cdot \frac{\partial T_i}{\partial V}\right) & \sum_i \frac{\partial T_i}{\partial c} \cdot \frac{\partial T_i}{\partial V} & \sum_i \frac{\partial T_i}{\partial m} \cdot \frac{\partial T_i}{\partial V} & \sum_i \left(E_i \frac{\partial T_i}{\partial V}\right) \\
\sum_i \left(\frac{\partial T_i}{\partial V} \cdot \frac{\partial T_i}{\partial c}\right) & \sum_i \left(\frac{\partial T_i}{\partial c}\right)^2 & \sum_i \frac{\partial T_i}{\partial L} \cdot \frac{\partial T_i}{\partial c} & \sum_i \frac{\partial T_i}{\partial m} \cdot \frac{\partial T_i}{\partial c} & \sum_i \left(E_i \frac{\partial T_i}{\partial c}\right) \\
\sum_i \left(\frac{\partial T_i}{\partial V} \cdot \frac{\partial T_i}{\partial L}\right) & \sum_i \left(\frac{\partial T_i}{\partial c} \cdot .5 \frac{\partial T_i}{\partial L}\right) & \sum_i \left(\frac{\partial T_i}{\partial L}\right)^2 & \sum_i \frac{\partial T_i}{\partial m} \cdot \frac{\partial T_i}{\partial L} & \sum_i \left(E_i \frac{\partial T_i}{\partial L}\right) \\
\sum_i \frac{\partial T_i}{\partial V} \cdot \frac{\partial T_i}{\partial L} & \sum_i \left(\frac{\partial T_i}{\partial c} \cdot \frac{\partial T_i}{\partial m}\right) & \sum_i \frac{\partial T_i}{\partial L} \cdot \frac{\partial T_i}{\partial m} & \sum_i \left(\frac{\partial T_i}{\partial m}\right)^2 & \sum_i \left(E_i \frac{\partial T_i}{\partial m}\right) \\
\sum_i E_i \frac{\partial T_i}{\partial V} & \sum_i E_i \frac{\partial T_i}{\partial c} & \sum_i E_i \frac{\partial T_i}{\partial L} & \sum_i E_i \frac{\partial T_i}{\partial m} & E_i^2 \sum_i E_i^2
\end{array}$$

it being understood that the summations are taken over all possible source-receiver pairs.

The quantities of importance to the Gauss-Newton Iteration are the diagonal terms and the entire right hand column.

The computation proceeds by choosing the most important parameter, as far as the accurate determination of T is concerned, as being the one (given in Step 2) of the four quantities:

the method of the present invention. Thus, a program 70 begins with an input stage 72 which functions with processing stage 74 to read the input measurements for a given localized area, which input measurements include travel times t for any number of reflecting horizons, and estimates for the values of V, L, and m. These values of t are available utilizing any of various well-known analogue or analogue/digital seismic signal processing equipment. The output from processing stage 74 is then applied to a processing stage 76 which functions to make corrections to the input times. Processing stage 76 will make any corrections which may be necessary to the input travel times t, i.e. source and receiver elevation corrections, re-insertion of $\Delta t$, elimination of times associated with a designated source or receiver position, etc.

The output from processing stage 76 is then applied to a pre-defined process stage 78 which serves to compute an initial estimate of c for each horizon or reflecting stratum. Thus, this amounts to computation of an estimate of depth perpendicular to the stratum selected for investigation. The output from the pre-defined process stage 78 is applied to a processing stage 80 which serves to select and store certain information relating to the processing. Processing stage 80 outputs to temporary storage devices the estimate of the velocity V, an estimate of the perpendicular depth c, as well as the corrected energy travel times t and their related source and receiver positions (coordinates). The output from processing stage 80 proceeds through a processing stage 82 wherein data selection relative to a specific reflecting horizon is made. Stage 82 serves to read initial estimate values for the velocity V, the c value, and the respective travel times t with their source and receiver locations for a specific reflecting horizon.

Information flow from processing stage 82 then proceeds to a pre-defined process stage 84 which serves to determine the best estimate of V, L, m and c values, this stage carrying out the standard nonlinear estimation technique. As previously described, the pre-defined processing stage 84 utilizes step-wise Gauss-Newton iterations, and these techniques use the function (4) as well as the partial derivatives (6-9) of the function with respect to each V, c, L and m. An iterative solution must be utilized in order to obtain a least squares solution due to the fact that the parameters V, L, m and c nonlinearly related.

Output from pre-defined process stage 84 then proceeds to a processing stage 86 wherein the residual time data for each iteration is written on magnetic tape. That is, the difference E between the input time t and the time T obtained by evaluating the function (4) for an iteration. The residual times t for all source-receiver paths may be optionally saved. These times may be used subsequently to provide an estimate of weathering or to test the assumption of a planar reflector. Output from processing stage 86 then proceeds to pre-defined process stage 88 which effects determination of the direction and amount of dip for the selected reflecting horizon or stratum. This stage utilizes the final estimates of V, C, L and m to make such determination, and this information is then output to stage 90 to provide an output record. The stage 90 provides printout of data for V, c, L, m, and dip information, as well as for residual values. The output stage 90 is also processed through a decision stage 92 to ascertain as to the completion of the processing as decision stage 92 tests for additional horizons related to the selected area. If there exist no more horizons to be processed, negative output via line 94 to the auxiliary operation stage A will serve to terminate the data processing function as this information is recycled to connector A and lead 96 for signification to the input of processing stage 74. Alternatively, if another horizon does exist for the area, affirmative output via lead 98 to auxiliary operation stage B will provide indicaion via connector B and lead 100 for restart of data processing at the processing stage 82. Thus, processing stage 82 will read additional values of V, L, travel times t, and receiver locations for the new data.

FIG. 6 illustrates one form of output plot which can be formed utilizing the present method, such an output providing a valuable reconnaissance tool in making certain planning and evaluation decisions relative to exploration of an area. As shown in FIG. 6, six cross-pattern input sequences were made at widely separated points to gain information as to dip and depth of seismic energy return. It is apparent from the agreement of data that the minimal amount of seismic reflection data provided a great amount of specific information over a large area. For example, if the source and receiver lines are each about two miles in length, this being a usual layout, it becomes apparent that the reconnaissance evaluation of FIG. 6 covers an area of about ten miles in dimension 72 by fourteen miles in dimension 74, an area of 140 square miles. Each of the plotted cross-patterns indicates the direction of dip and its amount in degrees while the cross-pattern itself represents the exact location of the seismic energy soundings. An examination of the dip direction at the various cross-patterns will show that there is quite good agreement with the actual contours of the land as represented by contours 76, 78, 80 and 82. With reference to the dip direction and amounts at each cross-pattern, it can be seen that they agree quite well in both direction and magnitude with the stratum depth variations to be expected as a result of the particular contours 76–82.

Figure 7:
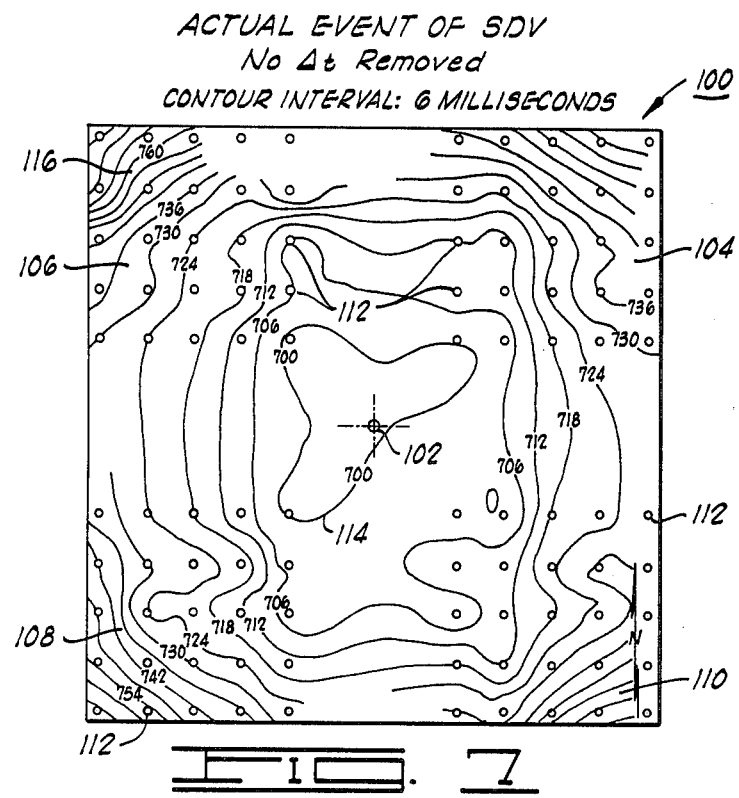
FIG. 7 illustrates a form of cross pattern data output in uncorrected form.
Figure 8:
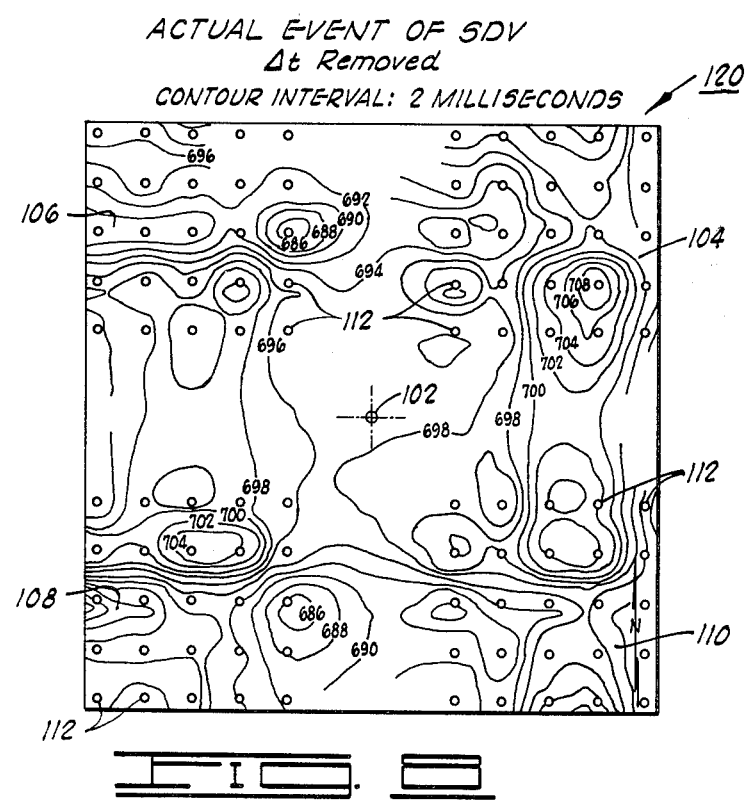
FIG. 8 illustrates the data of FIG. 7 after correction to remove selected time difference.

FIGS. 7 and 8 illustrate graphically what is concealed in the computational process, whether carried out by a digital computer or in an analog system, of removal of the curvature due to normal moveout ($\Delta t$), and show the effects of normal moveout on the original recorded data and of random variations in the original recorded data which originate from effects such as weathering in very shallow surface layers of the earth. FIG. 7 illustrates actual output data as derived for a source-receiver cross-pattern at a specified location. Thus, the output plot 100 consists of center point 102 and a quadrature array of reflection point patterns 104, 106, 108 and 110 each made up of a plurality of reflecting points 112. It may be noted that each of the reflection point patterns 104–110 consists of a square array of five reflection points 112 on each side. This would indicate the possibility of a source-receiver configuration wherein a line of ten sources and ten receivers are utilized in cross-alignment with the center of the cross unoccupied by either source or receiver equipment.

The arrival times (in milliseconds) of the relfected seismic energy are shown in contour relationship in FIG. 7. The contours are formed with six milliseconds contour interval and no time correction or normal moveout has been removed from the trace times. Thus, the seismic energy trace travel times range from 700 milliseconds at the central contour 114 up to as high as 760 milliseconds at contour 116. The seismic energy times of arrival are least at the center and greatest at the edges since no $\Delta t$ has been removed, and the contours are essentially circular due to the symmetry of the distribution of strike, dip, and velocity as applied on a horizontal stratum.

FIG. 8 represents a plot 120 of the same cross-pattern wherein the normal moveout or $\Delta t$ has been removed and, further, the contour interval is now reduced to two milliseconds. Thus, it can be noted that with $\Delta t$ removed there is a definite difference in the energy travel time values as well as the distribution of contours. The plot 120 apparently indicates considerable variance from the estimate plane of the subterranean structure but in fact the differences are chiefly due to near surface conditions.

It may be noted that this procedure assumes that the reflecting horizon is a plane over the entire area of reflection coverage, i.e. an area which accommodates each of the quadrature arrayed reflection point patterns 104, 106, 108, 110. If the seismic traces were obtained over a curved reflector surface, it is possible that a close fit average plane would be obtained but the velocity would be in error. Essentially, the procedure would assume that the curvature was due to normal moveout and would remove as much as possible, thereby obtaining a false velocity. Thus, in recording over a sharp anticline, the tendency will be to take out too much normal moveout and thus obtain velocities that are too slow, while the alternate effect will be obtained when recording the cross-pattern trace information over synclines.

FIG. 9 illustrates a best fit plane for dip as determined by the strike, dip, velocity (SDV) process. The dip was determined to be 50 feet per mile extending to the southwest. An inspection of the Δt removed data of FIG. 8 will give an indication that this is a generally accurate trend contouring to produce a best fit plane, and reading of the individual values of plot 120 discloses the trend of increased depth or travel times proceeding southwesterly across plot 120. This test data was found generally to agree with the geology of the area in which the actual seismic data was taken. The velocity determined for this event was an average velocity of 10,700 feet per second.

Geophysical reconnaissance in accordance with the method of the present invention will consist of setting up the cross-pattern source-receiver arrays at selected points of a grid which dimensions are regulated by economics and other considerations. While it is desirable that these source-receiver cross-patterns by layed out in uniform manner, e.g. along section lines, unidirectionally or the like, this will not always be possible and more often than not it will be necessary to select the optimum cross-pattern locations and to account for variances in uniformity through input to the computational equipment.

The plot of FIG. 10 shows the results of the reconnaissance method as applied over a very large area of rough terrain as caused by erosional features brought about in the predominantly shale surface by sporadic rains and melting snow. While it is desirable and originally planned to place the SDV cross-patterns at township corners, it proved to be unreasonably difficult and many allowances were made for cross-pattern disfiguration. In some cases it was necessary to move the cross-pattern locations as much as two miles from the uniform linearity in order to avoid such unreasonable terrain, and the arms of some cross-patterns were turned away from the true north-south and east-west orientation in order to obtain best recording conditions.

As the grid lines represent township and section markings, it is apparent that performance of the reconnaissance method establishing FIG. 10 data was carried out over a large area providing SDV data over nearly twenty townships, each being six miles square. Each of the source-receiver cross-pattern layouts was placed down at about six to seven mile intervals in each of the east-west and north-south directions, and these are indicated by the designations A-2, A-3, A-4m A-5, B-2 and so forth on up to D-5 and E-2. Each of the SDV cross-pattern indications includes a directional arrow showing the direction of dip as well as a printed numeral close by giving the exact measurement of degrees dip. Also, the data in parenthesis presents the calculated distances between 0.020 second contours which in this particular field map are hand contoured as based on calculated dips for the selected event reflection. Thus, determination of a lower order surface which will fit most of the data represented in FIG. 10 must be close to the contouring indication. Actually, a comparison of the FIG. 10 data with an objectively contoured map constructed by computer indicated a large degree of agreement for the area.

Figure 11:
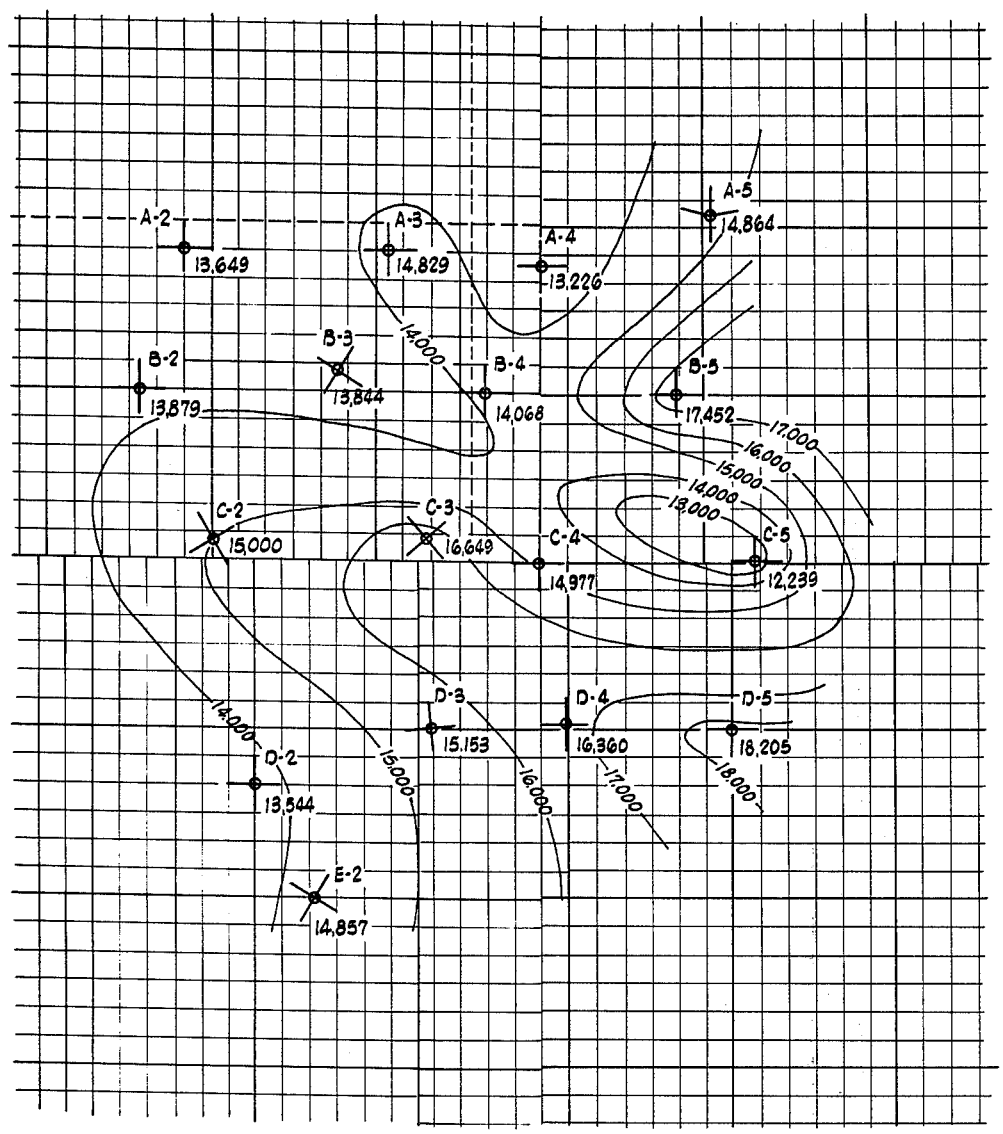
FIG. 11 is a contoured map of average velocity.

Further computation of average velocity for the data relating to FIG. 10 also proved valid and, in effect, computation of the average velocities as well as the dip, strike and the respective amounts as contoured between the plotted cross-pattern points serves to outline a map which will indicate a combination of both structure and stratigraphy. The plot of FIG. 11 is an average velocity plot provided by the reconnaissance data as utilized to form the plot of FIG. 10. The average velocity values are contoured to provide a planned view of stratigraphy in the area under reconnaissance.

It may be noted that the total volume of information was obtained with a minimum of layout and shooting effort as it merely required the placement and operation of sixteen separate source-receiver cross-patterns as spread over what would be cosidered a very large survey area. The approach to survey the area with normal methods would include a much greater number of layouts and individual operational procedures as executed along a plurality of lines of survey covering the area, such lines of survey being maintained continuous as closely as possible. Thus, of course, would be prohibitive for reconnaissance purposes and that is the reason for and value of the reconnaissance method of the present invention.

Still another alternative to the plan view mapping in making a geological interpretation would be by using the data in the form of a cross-sectional or profile indication. The associated computational system will allow the selection of any of the traces which were recorded from the various source-receiver cross-patterns of the reconnaissance shot sequences. Thus, a separate line of section may be selected for the purpose of providing profile information. FIG. 12 provides the profile comparisons as taken along a north-northeast south-southwest cross-section which joins the source-receiver cross-patterns E-2, D-3, C-3, B-4, and A-4. In this case, those traces in each SDV cross-pattern which were closest to the line of section, note that it bends at the center of the cross, were then played out as a standard width record. Interpretation of the profile data requires a somewhat different approach, but this too is well within the scope of the skilled geophysical interpreter.

The foregoing process description sets forth what has become known as the Seismic Dip Velocity method (SDV) as devised to meet a need for a fast reconnaissance method, and which finds particular use in locating structural oil fields in large land concessions. The method is basic in its approach to plural seismic trace data treatment, and new ideas and applications are continually being introduced tending to expand the scope and utility of the basic method as a geophysical tool.

AN ALTERNATIVE, EQUIVALENT ANALOG EMBODIMENT

It will be appreciated that the best mode contemplated for carrying out the method according to the present invention is reflected in the exemplary embodiment described above with reference to FIGS. 1–12. That embodiment utilizes a programmed digital computer, as described, for processing the data to determine the specific values of parameters which mathematically define a reflecting plane representing an underlying earth stratum, and from which strike and dip of the stratum may be obtained together with the velocity of seismic energy. It is, however, not necessary in the practice of the invention to utilize a digital system for processing the data, nor is it necessary to utilize either a software program or a digital computer. One skilled in the art may readily and routinely visualize and construct, from the teachings contained in the disclosure set out above, an "analog equivalent" of the digital system for carrying out the method which has been described. To make this abundantly clear, FIGS. 15–20 illustrate a suitable analog system which may be employed to process the field gathered seismic trace data, and based on such data determine a best fit plane from which the strike and dip of an underlying stratum may be obtained; as well as velocity of energy travel to and from the stratum.

GENERAL DESCRIPTION OF METHOD

The present invention may be readily understood from a brief summary of the concepts providing the basis for the invention. The first concept is that the approximate configuration of some substantial portion of a stratum underlying the earth's surface may be represented by a plane. Next, that such a plane, herein called a reflecting plane or horizon, may be mathematically defined by parameters, and that such a reflecting plane may be estimated by estimating these parameters (c, L and m) defining the plane. Further, that the estimated reflecting plane may be fitted to the measured travel times of seismic energy transmitted between source-receiver pairs and reflected from the portion of stratum being analyzed. Finally, that by changing the originally estimated parameter values, a best fit of an estimated reflecting plane to the measured travel times may be determined. The best fit plane then will represent the portion of earth stratum being analyzed, and the strike and dip of the best fit plane together with seismic energy velocity (V) used in the final determination of the best fit plane, will represent the strike and dip of that portion of earth stratum and the actual velocity of the seismic energy.

In carrying out the invention, seismic trace data is obtaind which is representative of travel time of seismic energy transmitted from source to relecting stratum to receiver in each of the four quadrants of a quadrantal array, and the estimated reflecting plane is assumed to be common to all four quadrantal related reflection patterns. Furthermore, the best fit of the estimated reflecting plane to the measured travel times is preferably obtained by the method of least squares, a method which is per se known but particularly applicable where, as here, it is desired to infer the most probable from a number of measurements. The method of least squares involves a determination of variance values between measured travel times t and determined travel times T to reflection points in an estimated reflecting plane and making the sum of the squares of the variance values E a minimum. According to the BMD publication hereinbefore mentioned, a computer program may be written which obtains a weighted least squares best fit by means of iterations on the non-linearly related parameters which in the present case ae V, c, L and m. Within each iteration, parameters are selected for change in a stepwise manner. The parameter selected at a given step is the one which differentially makes the greatest reduction in the error sum of squares. While the best fit of a reflecting plane to the measured travel times by the method of least squares may be otained with a digital computer and program as described in the BMD publication, essentially the same result may be achieved with the analog processing equipment of FIGS. 15 to 20.

CORRECTING MEASURED DATA

As a preliminary step, before processing the data in accordance with the method of this invention, certain adjustments are required to be made in the measured trace data to provide corrected travel times of seismic energy transmitted between source-receiver pairs. Adjustments are required for variations in elevation of the sources and receivers so that they are brought, in effect, to a common x-y plane. The foregoing is represented schematically in FIGS. 13a to 13c and in FIG. 14a tabulation of an exemplary two source-receiver pairs is given with their x-y coordinates and the corrected travel times taken from the traces represented in FIG. 13c.

Assuming a cross pattern of sources $S_1$–$S_{12}$ and receivers $R_1$–$R_{12}$ as illustrated in FIG. 1, a sheaf of records is illustrated in FIG. 13a, each record containing side-by-side seismic energy traces as recorded at all associated receivers $R_1$–$R_6$ and relating to one quadrant of a cross pattern. Each record is limited for purposes of this explanation to energy traces relating to reflection points in one quadrant, although it should be understood that receivers $R_7$–$R_{12}$ also record the same event. Thus the top record sheet RS-1 contains the recording traces from all receivers $R_1$–$R_6$ produced by the seismic energy pulse transmitted from source $S_1$, while the first underlying record sheet RS-2 contains side by side the recording traces from all receivers $R_1$–$R_6$ from the seismic pulse transmitted from source $S_2$, and so on through the sheaf of records.

FIGS. 13b–c schematically illustrate the conventional method for adjusting such original recording traces for differences in elevation of the actual locations of seismic sources and receivers. FIG. 14 represents a partial tabulation of the corrected travel times and x-y coordinates for source-receiver combinations, and this tabulated data serves as the basis for deriving the input signals to the analog equipment for determining the best fit plane for specific reflecting horizon. This tabulation is provided for exemplary purposes and does not purport to be a complete tabulation of actual events, but it is fairly representative of typical field gathered data for two pairs of source-receiver combinations. For explanation purposes the origin O of the coordinate system will be assumed to be at the center of a cross-pattern, although the origin may be at a different predetermined location. A full tabulation for the events recorded on the sheaf of records illustrated in FIGS. 13a–c where the sources and receivers are arranged twelve-by-twelve as shown in FIG. 1, would require thirty-six lines of entries for one quadrant reflection point pattern, or a total of one hundred forty-four lines of entries for all four reflection point patterns.

Now turning to FIG. 13b, the sheaf of records there illustrated contains the same recordings shown in FIG. 13a adjusted for elevation differences of the sources and receivers and offset distances (commonly called moveout or Δt). Such adjustments may be made manually or with the aid of analog equipment as is well known in the art, an example of such analog equipment for adjusting recording traces for "moveout" being shown in Wedenburg U.S. Pat. No. 3,077,573. In FIG. 13c the records show the traces after reinsertion of normal moveout and represent the traces corrected for elevation only, from which the travel times are taken directly in preparing the tabulation of FIG. 14.

Thus, in FIG. 13a, each trace labeled $R_1-R_6$ on a record RS-1 is a pictorial representation of a recording on a magnetic tape made from original field gathered data. The three distinct large amplitude trace oscillations marked with dots represent reflections from three reflecting stratum at different depths, and the dots indicate times of arrival of the marked reflections. In FIG. 13b corrections have been made in each trace for normal moveout, using conventional methods as discussed above, and elevation corrections have also been made as by playing back and rerecording the traces using movable heads which are adjusted in accordance with the elevation differences of sources and receivers noted by surveyors who laid out the sources and receivers in the field. The dots marking times of arrival of the marked reflections now lie in a substantially straight line and the angle of that line represents visually that the reflecting horizon is not horizontal. From the average time of arrival for each of the reflection horizons ($t_{1av}$, $t_{2av}$, $t_{3av}$) and with an estimate of velocity for each reflection horizon ($V_1$, $V_2$, $V_3$), an estimate of parameter c may be derived:

$$c_1 = \frac{V_1 t_{1av}}{2}$$

$$c_2 = \frac{V_2 t_{2av}}{2}$$

$$c_3 = \frac{V_3 t_{3av}}{2}$$

Since the measured time of travel data forming the basis for input signals to the analog or digital processing equipment include the effect of normal moveout, in FIG. 13c the traces are represented pictorially with normal movement restored, thus providing trace recordings corrected for elevation differences. The curvature of the line of dots marking each reflection horizon is due to the effect of normal moveout. The marks on the traces in FIG. 13c show time of arrival of reflections, and each trace represents corrected measured time travel data for one source-receiver pair ($S_i$, $R_j$). From such data, measured time travel signals ($t_{ij}$) are set up in the analog equipment. It will also be seen that each trace provides corrected measured time of travel data for three distinct underlying strata. In the ensuing description, only the first (shallowest) stratum will be treated, but the other two may be dealt with in successive identical procedures.

Analog System

The analog system is shown overall in block diagram form in FIG. 15. Utilizing the corrected time of travel data for each source-receiver pair (a portion of which data is tabulated in FIG. 14) and specifically the time of travel (t) of an event reflected from the first (shallowest) stratum, measured time of travel signals ($t_{ij}$) are generated in block 200 for each source-receiver pair of a set for which data is available. Measured time data as to at least four independent paths to the selected stratum are required, i.e., for at least four source-receiver pairs, and preferably a larger number for more reliable results. For purposes of this explanation, the analog system has been shown with circuits to process signals for a total of one hundred forty-four source-receiver pairs. Only a portion of the total number of circuits may be used, however, and the system can be expanded to include additional circuits if desired.

In addition to containing circuits for generating measured time of travel signals ($t_{ij}$), the block 200 contains circuits for generating signals representing the x and y coordinates of each source-receiver pair. Circuits are also included for generating parameter signals (c, L, m and V) representing geometrical parameters (c, L and m) mathematically defining an estimated plane underlying the earth's surface and representing velocity (V) of seismic energy between the earth's surface and the estimated plane.

The signals representing x and y coordinates of each source-receiver pair, and the parameter signals (V, c, L, m) are shown in FIG. 15 transferred to a block 202 which is a Determine T circuit for producing estimated plane time of travel signals ($T_{ij}$) representing time of travel for each source-receiver pair of seismic energy reflected from the estimated plane.

In accordance with the method of this invention, error signals ($E_{ij}$) representing the difference E for each source-receiver pair between the measured time of travel signals ($t_{ij}$) and the estimated time of travel signals ($T_{ij}$) are produced by circuits in block 204, which also contains circuits for providing signals representing the sum of the error values squared $\Sigma(E)^2$ for all source-receiver pairs in a set, and the output from the circuit block 204 is supplied to a meter for visually indicating the sum of the error squared values for an iteration involving a full set of source-receiver pairs.

In carrying out the method of this invention, after an iteration for a full set of source-receiver pairs, the parameter signals produced by the circuit block 200 are adjusted by means included in the circuits in a direction to reduce the error signals (E) and the sum of the errors squared $\Sigma(E)^2$, and such adjustments are repeated after successive iterations until the error signals and the sum of the errors squared are brought to a minimum value thus providing a best fit estimated plane to the measured time of travel signals. In order to determine after each iteration which parameter should be changed and its direction of change to make the most rapid progress in obtaining the best fit estimated plane, the circuit blocks 334, 350, 352 and 354 are utilized to produce signals representing the ratios corresponding to quantities (11), (12), (13), (14) hereinbefore set forth:

$$\frac{\left[\Sigma\left(E_{ij}\frac{\Delta T}{\Delta V}\right)\right]^2}{\Sigma\left(\frac{\Delta T}{\Delta V}\right)^2} \qquad (15)$$

$$\frac{\left[\Sigma\left(E_{ij}\frac{\Delta T}{\Delta c}\right)\right]^2}{\Sigma\left(\frac{\Delta T}{\Delta c}\right)^2} \quad (16)$$

$$\frac{\left[\Sigma\left(E_{ij}\frac{\Delta T}{\Delta L}\right)\right]^2}{\Sigma\left(\frac{\Delta T}{\Delta L}\right)^2} \quad (17)$$

$$\frac{\left[\Sigma\left(E_{ij}\frac{\Delta T}{\Delta m}\right)\right]^2}{\Sigma\left(\frac{\Delta T}{\Delta m}\right)^2} \quad (18)$$

Visual indications are provided on dials on devices herein herein shown as voltmeters 358, 360, 362, 364 of the magnitudes of said ratios (15), (16), (17) and (18), and the parameter of most importance can be selected from the voltmeter dial showing the greatest magnitude together with the direction of the required change from the "sign" indication on the voltmeter dial 366, 368, 370, 372.

Further in accordance with the method of the invention, after an iteration for a full set of source-receiver pairs, the parameter of most importance is selected and while the other parameter signals are held at constant values, then adjusted and another iteration performed, and adjusted one or more additional times, changed until the sum of the errors squared $\Sigma(E)^2$ as indicated on the voltmeter dial 206 is brought to a minimum value. The parameter of most relative importance among those remaining is then selected from the voltmeter dials 358, 360, 362, 364, and then adjusted in stepwise fashion while the other parameter signals are held constant, until the errors squared is brought to a minimum. That iteration procedure is followed for all four parameters (V, c, L and m). The entire procedure involving at each stage iteration on the most signifcant parameter may be repeated one or more times until a minimum value of the sum of errors squared within a predetermined tolerance factor is obtained. The best fit plane is then defined by the values of the parameters which have been reached as the final outcome of the iteration procedure, and from those parameter values can be obtained by conventional solid geometry techniques the attitude of the best fit plane which is the angle of the plane relative to a horizontal plane herein called "dip", and the azimuth of the plane which is its direction herein called "strike". The final parameter values c, L, m and n may be directly displayed on a digital display panel 260 (FIG. 15), if desired, together with strike, dip and the value of velocity used in the best fit plane determination.

During the digital processing of data described in an earlier section hereof, computations are made with the digital equipment of the partial derivatives of calculated time (T) with respect to each of the variable parameters V, c, L, m, and these partial derivatives $(\delta T/\delta V)$, $(\delta T/\delta c)$, $(\delta T/\delta L)$ and $(\delta T/\delta m)$ are utilized in the computational process to select the parameter to be changed in the stepwise iteration to obtain a best fit plane. In the determination made with the analog equipment described herein, the value of time T is determined directly and the ratios utilizing the partial derivatives of time T in the digital computation are provided by making the assumption that the partial derivative with respect to velocity can be replaced by $(\Delta T/\Delta V)$; that is, the incremental change of T produced by an incremental change of V. In this determination, the signals representing c, L and m are held constant.

In a similar manner, $(\delta T/\delta c)$ is replaced by $(\Delta T/\Delta c)$, this quantity being determined while V, L and m are held constant. Likewise, $(\delta T/\delta L)$ and $(\delta T/\delta m)$ are replaced by $(\Delta T/\Delta L)$ and $(\Delta T/\Delta m)$, respectively, and are determined while the other variables are held constant. Signals representing these quantities which replace the partial derivatives of time with respect to each of the variable parameters, are utilized in the ratios circuits 334, 350, 352 and 354 appearing on the right hand side of FIG. 15.

SOURCE-RECEIVER PAIR MEASURED TIME SIGNAL GENERATOR

For producing measured time signals representing measured time of travel of an event transmitted from a source to a receiver of the same pair and reflected from a reflection point at a selected stratum, together with signals representing the x and y coordinates for the source-receiver pair, a circuit represented at block 200 in FIG. 15 is provided, which circuit is detailed in FIG. 17a. Since for each iteration, to define the fit of an estimated plane to the time of travel data requires signals representing the measured time $t_{ij}$ and the x and y coordinates for each receiver pair, the circuit detailed in FIG. 17a provides means for pre-establishing the signals for all source-receiver pairs of a set from corrected field data so as to supply them to the analog system when required in the iteration procedure. Thus, by means of the circuit detailed in FIG. 17a, as a preliminary matter the measured travel times for all source-receiver pairs of a full set (e.g., 144 pairs) may be set up before the overall circuit is started in operation, and by means of timing signals produced from a timing generator shown in FIG. 16, signals from the source-receiver measured time signal generator are gated into the analog system when required in the iteration procedure.

Thus, referring to FIG. 17a, a bank of potentiometers 230 labeled the "t bank" is provided, each being manually adjustable to set the magnitude of its output voltage so as to represent measured time $t_{ij}$ for a corresponding source-receiver pair at respective coordinates $x_i$, $y_i$, $x_j$, $y_j$. The measured time of travel data is obtained from a tabulation based on field data and such as shown in FIG. 14. Each potentiometer 230 in the bank (which for one hundred forty-four source-receiver pairs would have one hundred forty-four such potentiometers) is shown as having a voltmeter 231 for visually representing the voltage appearing at the potentiometer wiper. It will be recognized that for convenience a voltmeter has been shown connnected to each potentiometer wiper. A signal voltmeter could be switched to each potentiometer wiper as it is being adjusted, if desired. The conductors leading to each potentiometer wiper are labeled $t_1$–$t_{144}$, this representing that the voltage appearing on the conductor is set by adjustment of the wiper to represent the measured time of travel for the corresponding source-receiver pairs in the full set of one hundred forty-four. The magnitude of the dc. voltage utilized to represent time of travel is on the order of one to several volts dc, with the units being 1 volt = 1 second of time.

Referring to FIG. 14, for the shallowest reflecting plane or horizon, it will be seen from the tabulation that for the source-receiver pair $S_2$, $R_6$ the time $t_{ij}$ is 1.015 seconds, which by the corresponding potentiometer of the t bank would be represented by 1.015 volts dc.

It will be seen from FIG. 17a that the conductors connected to the wipers of the potentiometers of the t bank transfer the signals from the potentiometers through gates $G_1$-$G_{144}$ to an output line (1), labeled $t_{ij}$ to represent the signal appearing on that line. The measured times (t) for all source-receiver pairs of the set are successively transferred from the potentiometer t bank to the output line (1) in a sequence determined by the operation of the gates $G_1$-$G_{144}$, which will be described in greater detail hereinafter in the description of the operation of the system.

It will be seen, however, that a similar set of gates $G_1$-$G_{144}$ are included in each of four additional banks of potentiometers labeled $x_i$ bank, $y_i$ bank, $x_j$ bank and $y_j$ bank. The potentiometers 232 of the $x_i$ bank are provided for establishing on the conductors connected to the wipers of the respective potentiometers, signal voltages representing the x coordinates of each of the sources of the one hundred forty-four sets of source-receiver pairs. Similarly, the potentiometers 234 of the $y_i$ bank provide means for providing signal voltages representing the y coordinates of each of the sources of the one hundred forty-four pairs. The potentiometers 236 of the $x_j$ bank and the potentiometers 238 of the $y_j$ bank provide, respectively, means for providing signal voltages representing the x and y coordinates of the receivers of each source-receiver pair of the entire one hundred forty-four sets. As with the potentiometers 230 of the t bank, each potentiometer of the x and y banks has associated therewith a voltmeter to represent visually the voltage obtained on the conductor leading from the wiper and representing the particular coordinate.

As indicated in the tabulation of FIG. 14, the x and y coordinates may be established in feet. As shown, the x coordinate of the source $S_2$ is minus one thousand feet. The magnitude of output voltages from the $x_i$ bank potentiometers may be on the order of 1 volt = 1000 feet and thus the corresponding potentiometer of the $x_i$ bank for the source-receiver pair $S_2$-$R_6$ (the first line of entries on the tabulation of FIG. 14) would be set to produce from the potentiometer a dc. voltage with a magnitude of −1 volt.

It will be recognized that the other potentiometers of the x and y banks are similarly set from the complete tabulation of x and y coordinates determined in the field by the surveying team laying out the cross pattern of sources and receivers so that the source-receiver signal generator circuit of FIG. 17a may be set up as a preliminary matter to have the signal voltages representing the coordinates of all sources and receivers of all pairs, available for transfer into the analog system when required in the iteration procedure under the control and guidance of the timing generator.

It should also be recognized that where as shown in the tabulation of FIG. 14, time of travel is determined for events reflected from successively deeper reflecting horizons, the x and y coordinates of the source-receiver pairs will be the same. Thus, the x and y banks of the potentiometers may be set up to represent the x and y coordinates of all source-receiver pairs, and only the t bank of potentiometers will require adjustment in using the analog system to determine a reflecting plane for each of the successively deeper reflecting horizons.

Similarly if several cross patterns of sources and receivers are set up in the field with the sources and receivers at the same coordinate locations, the x and y banks of potentiometers will not have to be readjusted, only the t bank of the potentiometers to represent the appropriate measured time of travel signals as recorded in the field and corrected prior to tabulation. It will also be seen from FIG. 17a that the gates $G_1$-$G_{144}$ are arranged similarly for all of the potentiometer banks. This means that the output lines (1), (2), (3), (4) and (5) which carry the signals $t_{ij}$, $x_i$, $y_i$, $x_j$, $y_j$, carry the set of signals associated with any one of the source-receiver pairs. The particular source-receiver pair represented by the signals on the output lines (1)–(5) will be established by the gating circuits $G_1$-$G_{144}$, which are supplied, respectively, with gating signals on the input conductors labeled $S_1$-$S_{144}$, which are the output conductors $S_1$-$S_{144}$ from the binary to absolute count decoder 240 of the timing generator detailed in FIG. 16.

PARAMETER SIGNAL GENERATOR

Figure 17B:
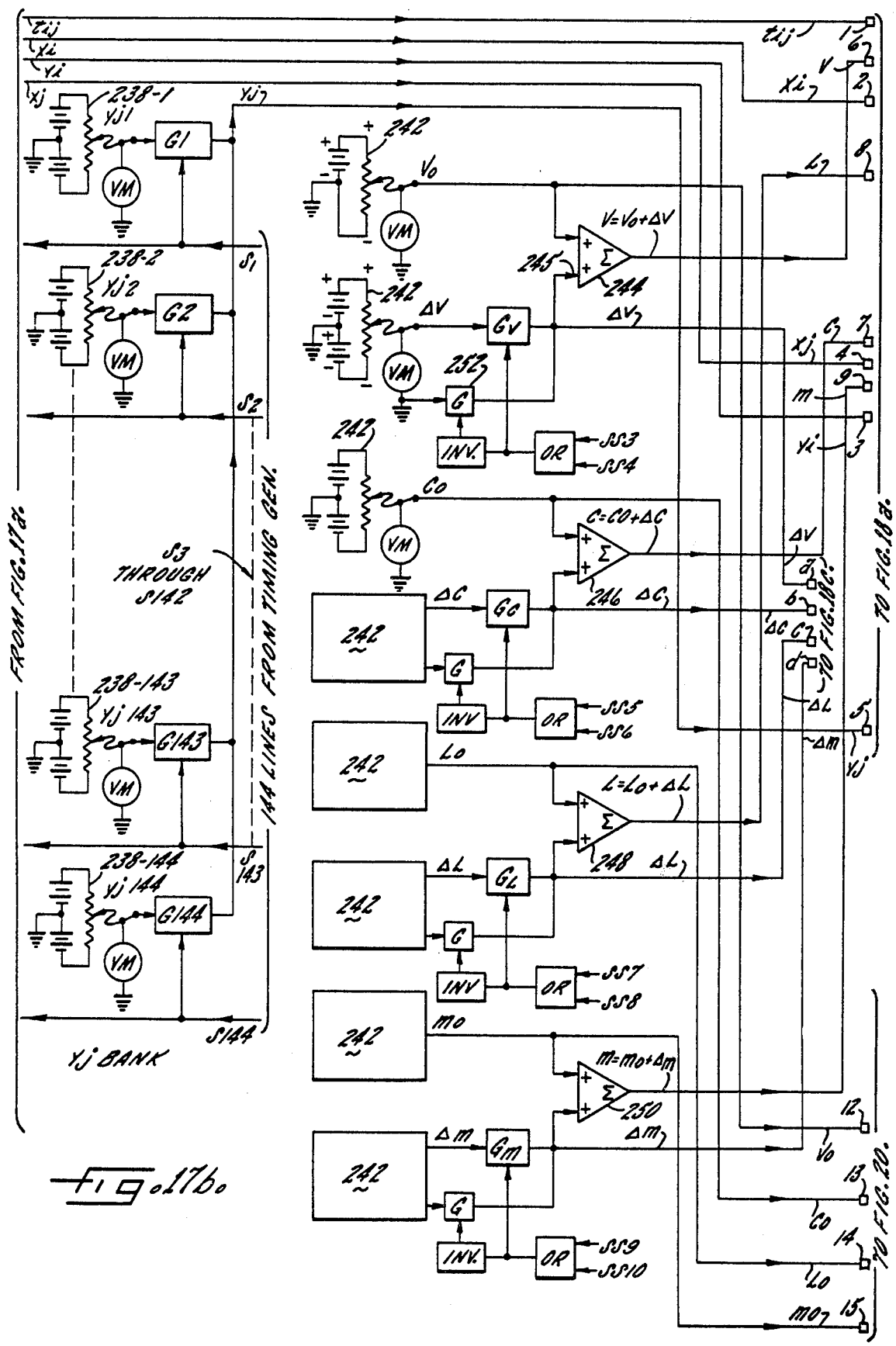

For each iteration, signals representing estimated plane parameter values are also required. For providing such parameter signals, a parameter signal generator circuit detailed in FIG. 17b is provided. This circuit is also arranged to be set up as a preliminary matter, so that the magnitudes of the parameter signals may be established and the signals gated into the analog system when required in the iteration procedure. As shown in FIG. 17b, a bank of potentiometers 242, arranged in pairs for each of the parameters V, c, L, m, provides means for producing signals representing the parameters and parameter increments. Since velocity will always be a positive number, the potentiometer for producing a signal voltage representing the parameter V may be adjusted to produce a positive voltage of a magnitude representing the velocity parameter. The other parameters c, L and m may be positive or negative, and hence the potentiometers for producing signal voltages representing those parameters are bipolar potentiometers, as shown, as is the potentiometer for producing the signal voltages representing all incremental values for all parameters.

Thus, by adjusting each one of the wipers of the bank of potentiometers 242, signal voltages of the requisite magnitude may be provided and transferred into the analog system under the control of the gating circuits shown in FIG. 17b. It will also be observed that signal voltages from the pairs of potentiometers 242 associated with each parameter, are supplied to an operational amplifier 244, 246, 248, 250 of a conventional type for summing the voltages applied to its input terminals.

Referring to the operational amplifier 244 associated with the velocity parameter potentiometers, it will be recognized that the output from this particular operational amplifier 244 will either be $V_o$, or the sum $V_o + \Delta V = V$, depending on whether or not the signal voltage representing $\Delta V$ is transferred from the $\Delta V$ potentiometer 242 to the input terminal 245 of the operational amplifier 244. The gating circuit associated with the $\Delta V$ potentiometers 242 is so arranged that when the voltages are low on lines $SS_3$ and $SS_4$ leading through the OR gate, the gate 252 is enabled which connects ground or a zero voltage to the input terminal 245 of the operational amplifier 244, and the gate $G_v$ is disabled, thus blocking the transfer of any $\Delta V$ voltage to the summing amplifier 244. With low voltages on lines $SS_3$, $SS_4$, therefore the output from the summing amplifier 244 will be the voltage derived from the $V_o$ potentiometer 242, and will represent in magnitude a velocity estimate of the value $V_o$.

Likewise, examining the circuits associated with the parameter c, it will be observed that when the lines $SS_5$, $SS_6$ carry a low voltage, the output from the summing amplifier 246 will be the voltage $c_o$ as established by adjustment of the wiper of the c potentiometer 242. When either input lines $SS_5$ or $SS_6$ carry a high voltage, the summing amplifier 246 associated with the parameter c will operate to sum two input voltages $c_o + \Delta c$, and produce a signal on its output terminal (7) representing the sum. The gating circuits associated with the L and m parameter potentiometers, are operated in a similar manner, depending on the signals carried over the timing conductors $SS_7$, $SS_8$ and $SS_9$, $SS_{10}$, respectively. These timing lines $SS_3$-$SS_{10}$ represent output lines from the binary to absolute decoder 254 and the timing generator detailed on FIG. 16.

In the operation of the analog system, signal voltages representing estimated values of the parameters V, c, L and m are utilized during each iteration for a full set of source-receiver pairs. The potentiometer bank of potentiometers 242 in the parameter signal generator circuit are arranged such that the voltages representing these parameters are obtained from the potentiometers $V_o$, $c_o$, $L_o$, and $m_o$. To change these parameter-representing voltages involves movement of the wipers associated with the potentiometers $V_o$, $c_o$, $L_o$ and $m_o$. In the iteration procedure there is also required signals representing increments of change in these parameters. Such signal voltages are provided by the potentiometers $\Delta V$, $\Delta c$, $\Delta L$ and $\Delta m$. Once these $\Delta$ potentiometers have been set, they will not normally be changed unless the operator desires to change the partial differentiation approximation carried out by the analog system circuitry. As representative values, the $\Delta$ potentiometers will be set to provide an increment of 0.1 volt, representing an increment of one hundred feet per second to the velocity parameter, one hundred feet to the distance parameter c, and 0.1 in the range of 0 to 1 in the direction cosine parameters L and m.

In summary, in carrying out the method of this invention with the analog system, signals are produced with the parameter signal generator representing estimated values for the parameters V, c, L and m defining an estimated reflecting plane. The method entails comparing the signals representing estimated travel times of reflections from the estimated plane with signals representing the measured travel times of reflections from the actual stratum. It can be seen that if there were no differences between the estimated travel time signals and the measured travel time signals for reflections measured by a number of source-receiver pairs, the estimated reflecting plane would precisely represent directly the configuration of the underlying stratum. In the method of this invention, by adjusting the parameter signals so that the differences are brought to a minimum value, a close approximation or best fit of the reflecting plane of the measured data can be obtained. The parameter signal generator provides analog equipment for establishing the original estimate of the parameter values and for making the requisite parameter value adjustments to carry out the method.

Determine T Circuit

Referring again to the overall block diagram in FIG. 15, the center circuit block 202 represents that circuit detailed in FIGS. 18a and 18b and utilized in the method of this invention for determining estimated time of travel signals $T_{ij}$. These signals are herein called estimated time of travel signals since they depend upon estimates of velocity and estimates of the mathematical parameters c, L and m defining the estimated plane. The circuit block 202 receives parameter signals from the parameter signal generator and signals from the source-receiver pair measured time generator, and from those signals determines the estimated time of travel signals $T_{ij}$ for each source-receiver pair.

How the determination of $T_{ij}$ for each source-receiver pair is made with the analog equipment can be seen by reference to FIG. 18a which at its left hand edge shows the input conductors (2), (3), (4), (5) which are the like numbered output conductors from the source-receiver pair measured time generator detailed in FIG. 17b. This set of input conductors (2), (3), (4) and (5) provide for each source-receiver pair signals representing the coordinates $x_i$ and $y_i$ for the source $S_i$, and the $x_j$ and $y_j$ coordinates of the receiver $R_j$. The other input conductors required for the Determine T circuit are at the left hand side of FIG. 18a and include conductors (6), (7), (8) and (9) which are like numbered output terminals from the parameter signal generator detailed in FIG. 17b. As the legends on the input conductors (6), (7), (8) and (9) indicate, these conductors carry signals from the parameter signal generator representing the parameters V, c, L and m.

It will be noted that the conductor (1) designated as carrying signals representing $t_{ij}$ at the left hand side and at the top of FIG. 18a, is the output conductor (1) also from the source-receiver pair measured time generator and carries measured time of travel signals $t_{ij}$, and this conductor (1) extends without interruption across FIG. 18a and is shown as an output conductor (11). Thus, the measured time signals $t_{ij}$ are not utilized in the Determine T circuit shown in FIG. 18a.

For facilitating this explanation, the analog circuit "Determine T" can be viewed as comprising three separate input sections at the top, center and lower portions, respectively, of FIG. 18 for producing signals representing the values s, p and $4uw^2$. The full equation represented y s is a portion appearing within the brackets on the first line of Equation (4) for $Thd_{ij}^2$ given in an earlier section hereof, while the equation represented by p as fully set forth on FIG. 18 is found within the brackets on the second line of Equation (4). Similarly, $4uw^2$ represents the portion in the third line of Equation (4) set forth in an earlier section hereof. From FIG. 18a it will also be seen that dc. signals representing s and p are each carried into a squaring amplifier which on its output provides signals representing $s^2$ and $p^2$, respectively. Those signals and the signals representing the expression $4uw^2$ are input signals to a summing amplifier 264 and the output of the summing amplifier 264 is carried to a multiplier 266. The other input to the multiplier 266 receives a signal voltage representing the quantity $(1/V^2)$ which is obtained from the input terminal (6) carrying a voltage representing V through a squaring amplifier and reciprocal amplifier to provide a voltage representing the input $(1/V^2)$ to the multiplier 266. The output from the multiplier 266 is carried to a square root amplifier and thence to an output conductor (10) which thus carries a signal voltage representing estimated time T.

It will be recognized that all the input conductors to the Determine T circuit on FIG. 18a will be energized together to produce an output signal T representing estimated time of travel for a particular source-receiver pair. The source-receiver pair is uniquely identified by the signals on the input conductors (2), (3), (4) and (5) representing the x and y coordinates of the source and receiver of that particular pair. It will also be recognized that in the method of this invention, the iteration procedure involves sequentially supplying such signals uniquely representing each source-receiver pair to the Determine T circuit. Thus, the output signal on the conductor (10) and representing T, changes as the signals uniquely representing the source-receiver pair change. The timing of each iteration step is determined by the timing generator of FIG. 15, but for any given source-receiver pair it can be seen that in deriving signals representing the quantity s, signals are required representing $x_j$, $x_i$, $L^2$, L, m, $y_i$ and c which are the x and y coordinates of the source of a source-receiver pair and the x coordinate of the receiver of the same pair, and the parameters mathematically defining an estimated plane. The signals representing the $x_j$ coordinate of the receiver $R_j$ is provided by the input conductor (4) which leads to the summing amplifier 268 directly. The signal representing the $x_i$ coordinate of the source $S_i$ is obtained directly from the input conductor (2) which leads directly to an inverting terminal of the summing amplifier 268. The estimated plane parameter L appears in the equation represented by s, first as $L^2$, and is obtained from the input conductor (8) and a squaring amplifier 270 and as a signal voltage $L^2$ is carried to a multiplier 272 for multiplication by the constant 2 to produce a voltage representing $2L^2$ at the output of the multiplier 272. The signal representing $2L^2$ is supplied to the multiplier circuit 274 which at its other input terminal receives a signal representing $x_i$ so as to produce at its output terminal a signal representing $x_i 2L^2$ which is carried to a non-inverting input terminal of the summing amplifier 268.

Incidentally, for the sake of brevity and simplicity, the well-known operational amplifiers shown in FIGS. 15–20 have been purposely illustrated with a conventional feedback connection omitted. Multiple input operational amplifiers are well known and conventional in the art and are available with both non-inverting and inverting input terminals, as shown for example on the input side of the operational amplifier 268 in the circuit for deriving voltages representing the quantity s.

The other voltages required to complete the inputs to the summing amplifier 268 are voltages representing the quantity 2L and $y_i$ obtained as shown on FIG. 18a from input conductors (3), (8) and (9). Thus, from the input conductor (3) a signal representing the $y_i$ coordinate of the source $S_i$ is supplied as one input to a multiplier circuit 278 which receives as its second input a signal from the input conductor (9) representing the parameter m. The output from the multiplier circuit 278 is passed to one input of a multiplier circuit 280, the other input to the circuit 280 being derived from the output of a multiplier 282 which serves to multiply a constant 2 and a signal representing the parameter L obtained from the input conductor (8).

The other input to the operational amplifier 268 is a voltage representing the quantity 2Lc obtained from the multiplier circuit 284 which receives on its input terminals a voltage representing the parameter c from the input conductor (7) and a voltage representing the product of the parameter L and the constant 2 obtained from the output of the multiplier circuit 282.

To carry out the method of this invention, the Determine T analog circuit also provides means for deriving a voltage representing the quantity p and including an operational amplifier 290 having five inputs. Voltages supplied to two of those inputs representing the $x_i$ coordinate of the source $S_i$ and the $y_j$ coordinate of the receiver $R_j$ are obtained directly from the input terminals (2) and (5), respectively. Another input to the operational amplifier 290 supplied in the inverting mode represents the quantity 2mc, obtained from a multiplier 292 supplied on its input terminals with voltage representing the parameters c and m from the input terminals (7) and (9), respectively. The output from the multiplier 292 is supplied as one input to the multiplier 294 the other input comprising a voltage representing the constant 2 and the output from the multiplier 294 is supplied to an inverting input to the summing amplifier 290. The voltage representing the quantity $2LMX_i$ is supplied to a non-inverting input of the amplifier 290 from a multiplier circuit 296 having two inputs, one representing the $x_i$ coordinate of the source $S_i$ obtained from the input terminal (2), and the other obtained from a multiplier circuit 298. The multiplier circuit 298 has two inputs in the form of voltages representing the parameters m and L with the latter having been multiplied in the multiplier 282 by the constant 2 to provide the requisite voltage representing the quantity 2L. The voltage representing m is obtained from the input conductor (9).

Also supplied to a non-inverting input terminal of the operational amplifier 290 is a voltage representing $y_i 2m^2$ derived from the muliplier 302. One input to the multiplier 302 is a voltage representing the $y_i$ coordinate of the source $S_i$ obtained from the input terminal (3). The other input to the multiplier 302 is a voltage representing the quantity $2m^2$, m being one of the estimated plane parameters and a signal representing m being supplied from the input terminal (9), and through the squaring amplifier 304 to provide a signal representing $m^2$ and through the multiplier 306, having as its other input a voltage representing the constant 2, to supply the requisite voltage representing $2m^2$ for input to the multiplier 302.

Now turning to the lower portion of the FIG. 18a circuit which provides circuit components for deriving signals representing the quantity $4uw^2$ required for the method of this invention, the voltage representing the quantity u is obtained from an operational summing amplifier 310 having an input supplied with voltages representing the constant 1 and two inverting inputs supplied with voltages representing the quantities, respectively, $L^2$ and $m^2$. These parameter voltages are obtained from the terminals (8) and (9) respectively after passing through squaring amplifiers 270 and 304, respectively. Voltages representing the quantity w are provided by the operational amplifier 312 which has supplied to its two inverting inputs voltages representing expressions $LX_i$, obtained from the multiplier circuit 314 with two inputs supplied respectively from terminals (8) and (2) which provide signals representing the parameter L and the $x_i$ coordinate of the source $S_i$, respectively. The other inverting input to the operational amplifier 312 is supplied with a voltage representing the quantity $my_i$, derived directly from the output of the multiplier circuit 278. After operation by the squaring amplifier circuit 314 providing at its output a voltage representing the quantity $w^2$, the voltage representing u and $w^2$ are supplied as inputs to the multiplier circuit 316 and after operation on the output signals from the multiplier circuit 316 and the multiplier 318, a signal representing the quantity $4uw^2$ is provided for input to the summing amplifier 264.

To summarize briefly, the Determine T circuit is utilized in carrying out the method of this invention to provude estimated time of travel signals $T_{ij}$ for each source-receiver pair. During the iteration procedure, signals representing the coordinates of each source-receiver pair are fed to the Determine T circuit, and as the coordinates change, the output signal $T_{ij}$ will change. The successive steps of an iteration procedure are, as mentioned above, carried out under the control and direction of the timing generator shown in FIG. 15.

DETERMINE E CIRCUIT

In carrying out the method of this invention, the analog system is utilized to produce error signals representing the difference for each of the source-receiver pairs between measured time of travel signals $t_{ij}$ and estimated time of travel signals $T_{ij}$. The circuits for producing the error signals E are shown in FIG. 18b, and include an operational amplifier 320 having the measured time of travel signals $t_{ij}$ supplied from the input conductor (11) to a non-inverting input and the estimated time of travel signals $T_{ij}$ supplied to an inverting input from the input terminal (10), which is the output terminal (10) from the Determine T circuit detailed on FIG. 18a and described in the preceding section. Assuming signals $t_{ij}$ and $T_{ij}$ for a source-receiver pair $S_i$, $R_j$, the output from the operational amplifier 320 will represent the difference $E_{ij} = t_{ij} - T_{ij}$. In the stepwise iteration procedure, known as the method of least squares, preferably followed in carrying out the method of this invention, the error signal $E_{ij}$ is squared in the squaring amplifier 322 and is supplied to an accumulator 324 designated as a summing and storing circuit, which sums the squared error signals $E_{ij}^2$ produced for each of the source-receiver pairs.

SUMMING AND STORING CIRCUIT

Since the internal circuitry for the summing and storing circuit, herein also called an accumulator since that is its primary function, is the same as utilized in other summing and storing circuits in the analog system, for example, the circuits 328, 330 and 332 in the V ratios circuit 334, such internal circuitry will be briefly summarized with reference to FIG. 19 which shows in detail the internal circuitry. Where the circuits such as circuits 328, 330 and 332 are labeled in the analog system "summing and storing circuit", it can be assumed that this same internal circuitry detailed in FIG. 19 is utilized.

The summing and storing circuit 324, shown in FIG. 19b in block diagram form, serves to sum signals appearing on its input terminal 340 under the control of timing signals received at its enter input (A). Thus, the voltage appearing at the input terminal 340 when a timing signal is supplied to the enter terminal (A) is gated into the summing and storing circuit and summed with voltages previously entered, and a voltage representing the sum appears at the output terminal 342. Referring to FIG. 19a, the input signals on the conductor 340 are supplied to the inverting input of an operational amplifier 343. The output from the operational amplifier 343 is inverted and supplied to the gate $G_e$ which is normally disabled. When a timing pulse is received at the enter terminal (A), the gate $G_e$ is opened to carry the input signal designated $E_{n+1}$ in FIG. 19a to a sample and hold circuit 344, such that after the timing signal has been removed from the enter terminal (A) and the gate $G_e$ closed, the output from the sample and hold circuit 344 will remain as the input voltage $E_{n+1}$. The output of the sample and hold circuit 344 is carried to the sample and hold circuit 346 through a normally enabled gate G so that the output of the second sample and hold circuit 346 will normally be the same as the output of the first sample and hold circuit 344. When a next timing pulse is received at the enter terminal (A), however, the timing pulse enables the gate $G_{add}$, and disables the input gate G to the sample and hold circuit 346, so that the voltage appearing at the output of the sample and hold circuit 346 is routed to the input to the operational amplifier 343 and added to the incoming voltage $E_{n+2}$. Thus, the output from the operational amplifier 343, after the second timing pulse is received at the enter (A) terminal, is the sum of the first voltage entered $E_{n+1}$ plus the second voltage entered $E_{n+2}$, and after that output voltage is inverted and gated through the gate $G_e$ which is enabled by the same timing pulse, the sum voltage will be transferred to the input of the first sample and hold circuit 344, and appear at its output terminal as the sum of the voltage $E_{n+1} + E_{n+2}$. When the timing pulse is removed from the enter terminal (A), thus disabling the input gate $G_e$ to the first sample and hold circuit 344, that circuit 344 will hold the sum voltage on its output terminal. Therefore, as the timing pulses are successively received at the enter terminal (A) to the summing storage circuit 324, the error voltage E appearing on the input terminal coincident with the arrival of the timing pulse will be added to the sum of the error voltages previously entered and held in the sample and hold circuit 344, and thus will appear as the sum at the output terminal 342.

When the circuit 324 is utilized in the Determine E circuit in the top portion of FIG. 18c, the voltages supplied to the summing and storing circuit 324 represent $E_{ij}^2$, that is, the square of the error signals. Thus, the output of the summing and storing circuit in the Determine E circuit will represent the sum of the error squared, and that output from the terminal 342 will be supplied to means such as a voltmeter for visually indicating the magnitude of the sum of the error squared. The summing and storing circuits 324 in addition to the input and output terminals hereinbefore mentioned, also include the reset terminal R. A pulse supplied to the reset terminal R enables the reset gate $G_r$ which supplies a zero voltage to the input of the sample and hold circuit 344 to clear the sample and hold circuit of any accumulated voltage, and through the connection to the second sample and hold circuit 346 will also clear that circuit of any accumulated voltage. When the reset pulse is removed from the terminal R, it disables the reset gate $G_r$ and the circuit is cleared for operation.

ITERATION PROCEDURE

It will be understood from the description hereinbefore set forth, that the method of this invention begins with the placing of seismic sources and receivers in a crossed-line array at a field location, and energization of the seismic sources sequentially and recording energy data by all of the receivers for each sequential source energization. From the recorded energy data, measured time of travel of events reflected from the stratum selected for analysis will be provided for each of the source-receiver pairs included in the array and operated to record usable trace data. As mentioned in connection with the partial tabulation of FIG. 14, a typical cross-pattern can include one hundred forty-four source-receiver pairs, and reflections of events from one hundred forty-four reflection points divided among the four quadrants of the quadrantal array. Thus, the analog system disclosed herein is shown with circuits for processing the collected data relative to such an array of one hundred forty-four source-receiver pairs.

In carrying out the method of this invention, the data relative to the source-receiver pairs is processed in sequence. The sequence begins with any given source-receiver pair $S_i$, $R_j$, at their locations identified by coordinates $x_i$, $y_i$ and $x_j$, $y_j$, respectively. The error signal E, and the error signal $E^2$ is obtained for that particular source-receiver pair as a first step in the iteration procedure. The next step in the procedure is to obtain the error E, and the error $E^2$, for any other source-receiver pair in the set, and to sum the error squared for the first receiver pair and the error squared for the second receiver pair. With one hundred forty-four source-receiver pairs, one hundred forty-two additional such steps are involved in the iteration so that after a total of one hundred forty-four steps, a signal representing the sum of the error squared for one hundred forty-four source-receiver pairs will be stored in the summing and storing circuit 324 and represented visually on the voltmeter dial 206.

At each step of this iteration procedure, the values of the parameters V, c, L and m are held at constant values representing the original estimates. At the conclusion of a complete iteration, in carrying out the method of this invention, one of the parameters is selected for adjustment in a direction to reduce the sum of the error squared after a complete iteration has been carried out with the new parameter values. In carrying out the invention, the analog circuitry also provides means for indicating to the operator of the system, after the completion of a first iteration, which parameter should be adjusted and the direction of its required change to more rapidly reduce the sum of the errors squared towards a minimum value, and thus obtain a best fit reflecting plane to the measured data.

Referring to FIG. 18c, the circuits 334, 350, 352, 354 labeled respectively, V ratios circuit, c ratios circuit, L ratios circuit and m ratios circuit, are included in the analog system to provide means for indicating the parameter to be adjusted for each successive iteration to reduce the error signals.

The iteration procedure carried out with the analog circuitry herein disclosed follows the computational procedure (Section 4 of the BMD publication reproduced above) closely, as can be seen by the following outline of a step-by-step procedure detailed in that section in terms of the variables used in the present method invention.

The computational procedure seeks to minimize the sum of the squares of the errors, which are the quantities given by the difference between the field measured reflection times and the determined reflection times for a given set of parameters (V, c, L, m) values. This sum is taken over all pairs of source and receiver points in the field cross spread. For example, in the case of twelve sources and twelve receivers, there would be one hundred forty-four source-receiver pairs. In carrying out the method with the analog apparatus, the error squared is obtained for each field source-receiver pair and these are added to give the sum of the errors squared.

In the computational procedure outlined in the BMD publication, the values of $(\delta T_{ij}/\delta V)$, $(\delta T_{ij}/\delta L)$, $(\delta T_{ij}/\delta m)$, $(\delta T_{ij}/\delta c)$, are calculated, whereas in the analog equipment, these quantities are determined by utilizing signals representing increments of the parameter values $\Delta V$, $\Delta c$, $\Delta L$ and $\Delta m$. The ratios circuits 334, 350, 352 and 354 include circuitry for operating upon input signals representing ratios corresponding to the foregoing partial derivatives, namely, $(\Delta T/\Delta V)$, $(\Delta T/\Delta c)$, $(\Delta T/\Delta L)$, $(\Delta T/\Delta m)$, to derive output signals representing the more complex ratios given above as Equations (11), (12), (13) and (14), and in the analog form represented on FIG. 18 adjacent the output voltmeters for the ratios circuits 334, 350, 352 and 354, respectively, and reproduced immediately below:

$$\frac{\left[\Sigma\left(E_{ij}\frac{\Delta T}{\Delta V}\right)\right]^2}{\Sigma\left(\frac{\Delta T}{\Delta V}\right)^2} \quad (15)$$

$$\frac{\left[\Sigma\left(E_{ij}\frac{\Delta T}{\Delta c}\right)\right]^2}{\Sigma\left(\frac{\Delta T}{\Delta c}\right)^2} \quad (16)$$

$$\frac{\left[\Sigma\left(E_{ij}\frac{\Delta T}{\Delta L}\right)\right]^2}{\Sigma\left(\frac{\Delta T}{\Delta L}\right)^2} \quad (17)$$

$$\frac{\left[\Sigma\left(E_{ij}\frac{\Delta T}{\Delta m}\right)\right]^2}{\Sigma\left(\frac{\Delta T}{\Delta m}\right)^2} \quad (18)$$

After a full iteration for all source-receiver pairs of a set based on a first estimate of the values for the parameters (V, c, L, m) the operator of the analog equipment looks at the dials of the voltmeters 358, 360, 362, 364 to determine which parameter should be changed to make the most rapid progress in minimizing the error squared, and obtaining a best fit plane. The voltmeter dial indicating the largest magnitude designates the most sensitive parameter and the one to be changed. The dials of the other set of output voltmeters 366, 368, 370, 372, from the ratios circuits designate by the sense (positive or negative) of the signal displayed, whether the chosen parameter should be incremented or decremented. The voltmeters of this latter set can be connected either to show by a negative display that the respective parameters should be incremented, or vice versa, as desired. This latter set of "sign" voltmeters 366, 368, 370 and 372 represent, respectively, the sums of the analog equivalents of the partial derivatives of time with respect to the parameters V, c, L, m, namely:

$$\Sigma\frac{\Delta T}{\Delta v} \quad (19)$$

$$\Sigma\frac{\Delta T}{\Delta c} \quad (20)$$

$$\Sigma \frac{\Delta T}{\Delta L} \quad (21)$$

$$\Sigma \frac{\Delta T}{\Delta m} \quad (22)$$

By examination of the functions (15) through (22), it should be clear that to derive signals representing these function in these ratios circuits, at each step of an iteration which involves determination of an error squared signal for one source-receiver pair, a determination is also required of signals representing an incremental change in determined time T ($\Delta T$) with respect to an incremental change in each of the parameters V, c, L and m ($\Delta V$, $\Delta c$, $\Delta L$, $\Delta m$). In carrying out this method invention, the analog circuitry is utilized to perform a sub-sequence at each source-receiver step of an iteration, before the next source-receiver iteration step is performed. Thus, when a full iteration for all source-receiver pairs has been completed, the sum of the incremental change in the determined time T relative to each of the parameters, obtained during the sub-sequences, is obtained for all the source-receiver pairs. Those sums $\Sigma(\Delta T/\Delta V)$, $\Sigma(\Delta T/\Delta c)$, $\Sigma(\Delta T/\Delta L)$ and $\Sigma(\Delta T/\Delta m)$ are displayed on the second set of output voltmeters 366, 368, 370 and 372 to represent the sign of the parameter quantity contained in the error sum of the squares $\Sigma(E)^2$. Also, when a full iteration has been completed, signals representing the more complex ratios (15), (16), (17) and (18) are also displayed on the first set of output voltmeters 358, 360, 362, 364, involving a determination during each sub-sequence of the increment ratios (example $\Delta T/\Delta V$) and the sums shown in the complex ratios for all source-receiver pairs.

RATIOS CIRCUITS

The iteration steps, as well as the sub-sequence carried out at each iteration step, are timed by signals from the timing generator circuit detailed in FIG. 16. Each sub-sequence requires a determination of the incremental change in determined time T for a given source-receiver pair, produced by an incremental change in each of the parameters V, L, c and m. How such determinations are made with the analog circuitry can be seen by referring to FIG. 18c, and particularly the V ratios circuit 334 which contains the circuitry used in the c ratios circuit 350, L ratios circuit 352, and m ratios circuit 354. Only the V ratios circuit 334 has, therefore, been detailed.

The V ratios circuit 334 is supplied by two input signals carried to the divider circuit 380, one input signal representing $\Delta T$, and the other input signal representing $\Delta V$ from the input terminal (a) which is the output terminal (a) at the right hand side of FIG. 17b from the $\Delta V$ potentiometer 242. The $\Delta V$ signal may be assumed to be of constant magnitude, although it may be changed and increased or decreased by adjustment of the pot wiper for the potentiometer 242, the assumed magnitude being 0.1 volts dc. representing seismic energy velocity of one hundred feet per second. With the gating circuits associated with the $\Delta V$ potentiometer 242 (FIG. 17b) under the control of the timing generator, a $\Delta V$ signal is supplied to the input of the V ratios circuit when required in the sub-sequence. Parenthetically it may be mentioned that the inputs to the c ratios circuit, L ratios circuit and m ratios circuit include, respectively, signals representing $\Delta c$, $\Delta L$ and $\Delta m$ also obtained from the potentiometers 242 of the parameter signal generator.

The other input to the V ratios circuit 334, as mentioned, is a signal representing $\Delta T$, i.e., an incremental change in determined time T resulting from the incremental change in velocity $\Delta V$. To produce a signal representing $\Delta T$ involves with the analog circuitry shown, successive determinations of T herein designated as T, T'. The initial determination of T is made with the use of the Determine T circuit and the pre-set potentiometers 242 of the parameter signal generator from which are obtained voltages representing estimated values of the parameters V, c, L, m, designated in FIG. 17b as $V_o$, $c_o$, $L_o$ and $m_o$.

A second determination of T, herein called T', is made with the use of the Determine T circuit and the same parameter values and voltages representing $c_o$, $L_o$ and $m_o$, except with the velocity parameter voltage $V_o$ incremented by a voltage representing $\Delta V$ such that the velocity parameter is represented by a voltage $V = V_o + \Delta V$.

In order to produce $\Delta T$, representing the difference $T' - T$, the initial determination of T is supplied to a sample and hold circuit 382 (FIG. 18b) under control of an input gate G supplied by a pulse from the timing generator over the line labeled $SS_2$ which pulse is supplied to open the input gate G momentarily substantially coinciding with the beginning of each successive iteration step. When the short duration pulse supplied over line $SS_2$ is removed from the input gate G, the sample and hold circuit 382 then holds the initial determination of T. After the initial determination of T, the sub-sequence is started under the control of the timing generator and a pulse is supplied from the timing generator (FIG. 19) over an output line labeled $SS_3$. That $SS_3$ signal is conveyed through the gating circuit associated with a $\Delta V$ potentiometer 242 to open the output gate and convey the $\Delta V$ voltage from the potentiometer 242 to the summing circuit 244 and thus produce on the output line to the terminal (6) a voltage representing $V = V_o + \Delta V$. That voltage is then supplied by the input terminal (6) to the Determine T circuit and produces, from operation of the internal circuitry, a voltage T' at the output terminal (10).

With the Determine T circuit functioning to produce an output voltage representing the quantity T' based upon the voltage representing $V = V_o + \Delta V$, the signal T' is conveyed by the input terminal (10) on FIG. 18b toward the ratios circuits. It is transferred to the summing amplifier 390 where with the other input to the summing amplifier 390 being conveyed to an inverting terminal from the sample and hold circuit 382, a subtraction is made to produce a voltage representing $\Delta T = T' - T$. That $\Delta T$ signal is then supplied to the divider 380 at the input to the V ratios circuit. The output of the divider circuit 380 is conveyed through a gate $G_v$, opened by the same sub-sequence timing signal $SS_3$ and appears now as a voltage representing ($\Delta T/\Delta V$). That output voltage from the divider 380 is conveyed to a squaring amplifier 394 producing at its output a voltage representing $(\Delta T/\Delta V)^2$ which is carried to a summing and storing circuit 330 serving as an accumulator. By means of this accumulator 330, voltages representing the quantities $(\Delta T/\Delta V)^2$ are summed for all source-receiver pairs when a full iteration has been completed. That output voltage is conveyed to a divider 396. The divider 396 has two imput terminals, the other receiving a voltage representing the quantity:

$$\left[\Sigma\left(E_i \frac{\Delta T}{\Delta V}\right)\right]^2$$

The input voltage to the upper terminal of the divider circuit 396 is obtained from a squaring amplifier 398 supplied with an output voltage from the summing and storing circuit 328. The summing and storing circuit 328 is supplied with an output from the multiplier 398 which receives input signals representing the error signals $E_{ij}$ representing the error for a corresponding source-receiver pair, and a signal representing $(\Delta T/\Delta V)$ from the output of the divider 380. Looking to the output indicator 358 from the V ratios circuit it can be seen that the divider circuit 396 operates on the signals that are supplied to its two inputs to produce the output signal representing the complex ratio designated Equation (15) hereinbefore and represented on FIG. 18c adjacent the output voltmeter 358. The dial of that voltmeter 358 displays the sum of signals produced for each source-receiver pair each step of the iteration, and at the completion of the full iteration, by the magnitude displayed on the voltmeter 358 the operator can determine the relative importance of the parameter V with respect to the sum of the error squared determinations. The other output voltmeter 366 is supplied with a signal representing $\Sigma(\Delta T/\Delta V)$ from the output of the summing and storing circuit 332, which receives as its input at each step of the iteration a signal representing $(\Delta T/\Delta V)$. It also can be seen from FIG. 18c that the summing and storing circuits 328, 330 and 332 are supplied by enter signals over the line designated SS$_4$ which is supplied by a pulse from the timing generator so that once each iteration step, during the sub-sequence, the quantities on the input lines to the summing and storing circuits are entered and accumulated therein, thus to provide at the completion of the iteration the summed voltages for all source-receiver pairs.

In like fashion, as will be explained in greater detail later, during each sub-sequence for each source-receiver pair the ratios circuits 334, 350, 352, 354 are operated in succession to derive output signals and to sum those output signals with the output signals for all source-receiver pairs. By referring to FIG. 18c it can be seen that the derived signals which are a function of $\Delta T$ in each of the ratios circuits 350, 352, 354 are entered into the accumulators in those circuits under the sub-sequence control provided by the timing generator over the signal lines SS$_5$, SS$_6$ for the c ratios circuit, SS$_7$, SS$_8$ for the L ratios circuit and SS$_9$, SS$_{10}$ for the m ratios circuit, the timing pulses over these SS lines being supplied at discrete sub-sequence steps such that these ratios circuits are operated in timed succession during the sub-sequence.

ANALOG CIRCUITRY OPERATING SEQUENCES

In performing the method of this invention with the use of the analog circuitry of FIGS. 15-20, it has been stated before that trace data is obtained from plural source-receiver pairs, for example one hundred forty-four such pairs from a twelve-by-twelve cross pattern as shown in FIG. 1. This means thirty-six reflection points in each quadrant for a like total of one hundred forty-four reflection points in all four quadrants, each point corresponding to one source-receiver pair. When we mention reflection times herein, we mean the measured time for transmittal of seismic energy, created by energizing a source, from a source to a receiver of one pair and reflected from a reflection point at an underlying stratum; as seen from the trace data pictorially represented in FIGS. 13a-c, reflection planes or horizons may be of different depths, but each one is treated separately and the determination completed for a best fit plane for each stratum before a plane determination is made for a stratum at a different depth, in carrying out the method of this invention.

Before the operation of the analog circuitry to determine the strike and dip of a selected stratum, based upon the assembled data from a cross pattern of sources and receivers, as a preliminary step the tabulation of FIG. 14 is made to list the x and y coordinates for each source-receiver pair and the reflection times obtained after correction of the original field recorded trace data as hereinbefore described. Thus, a complete tabulation for all one hundred forty-four source-receiver pairs of the set will be made like the entries for two of the pairs as shown on FIG. 14.

Also required as a preliminary matter are original estimates for a selected underlying stratum, of the parameters V, c, L and m for an estimated plane having the configuration of the stratum. Seismic energy velocity can be estimated for the particular location and with knowledge of the general character of earth layers between the earth's surface and the underlying stratum selected for analysis. How to estimate the distance c was explained above. Estimates for the plane parameters L and m can also be made by assuming a horizontal reflecting plane or based on previously obtained trend data, a dipping plane at any given angle of strike may be assumed.

With the values estimated for the parameters, the first step before starting operation of the analog circuit is to adjust the potentiometers 242 of the parameter signal generator (FIG. 17b) to provide output voltages representing the estimated parameter values. Also, the $\Delta$ potentiometers 242 are adjusted for a predetermined increment, i.e., a 0.1 volts dc. in each case representing increments of one hundred feet for the distance c, one hundred feet/second for velocity of seismic energy V, and 0.1 for both of the direction cosine values for L and m.

Next, from a tabulation made like FIG. 14, the corrected reflection times are used for adjusting the measured time of travel potentiometers 230 (called the t bank) of the signal generator (FIG. 17a). Thus, all of the potentiometers of the t bank can be adjusted as a preliminary matter, so that measured time of travel signals are available when required for each of the source-receiver pairs. Similarly, the x and y banks potentiometers (FIG. 17a) are also adjusted to establish signals representing the coordinate locations of each of the source-receiver pairs, and thus voltages representing locations of each source-receiver pair are available when required in the operation of the analog circuit.

TIMING GENERATOR

Now turning to FIG. 16, a timing generator is shown which operates gating circuits throughout the analog system to carry out the present method invention in an orderly and reasonably rapid manner, although in presenting this analog counterpart of the digital system disclosed in an earlier section hereof, no effort has been made to minimize the time required for analog system operation. As stated above, it is preferred to use a digital computer with suitable software program to process the data and carry out the method invention. However, the disclosed analog system does provide the requisite circuitry and does operate in a manner much like a digital computer, although more slowly and with less accuracy, to produce parameters of a best fit plane representing directly the configuration of a selected strata.

Assuming, therefore, that preliminary setting up has been accomplished of the potentiometers 242 of the parameter signal generator, and the t, x an y bank pots of the measured time source-receiver signal generator, the start of the operation of the analog system is begun by actuating the start switch 400 in the timing generator section of the circuit on FIG. 16. This will start the operation of the analog system to carry out a first trial to derive a best fit plane to the measured reflection time data for a selected strata and tabulated for a full set of one hundred forty-four source-receiver pairs.

The timing generator outputs two sets of timing pulses. The first set of timing pulses, herein called the master sequence or master iteration timing pulses, is provided by the binary to absolute count decoder 240, and these master timing pulses define each step of the master iteration and appear at the rate of about 8 Hz on the output lines $S_1$–$S_{145}$, in succession. A second set of timing pulses, herein called the sub-sequence timing pulses, is provided by the binary to absolute count decoder 254, these sub-sequence timing pulses defining successive steps of a sub-sequence which occurs between each step of the master sequence. The sub-sequence timing pulses appear at the rate of the clock pulses. For purposes of this explanation, it can be assumed that the clock frequency is ninety-six Hz, which with the divide by twelve counter will produce the above mentioned master sequence rate of eight Hz, but the clock oscillator output frequency can be increased, if desired, to reduce the total time for required for a complete iteration.

The master sequence timing pulses as shown on the output lines $S_1$–$S_{145}$ from the decoder 240, primarily time the operation of the analog system to carry out each iteration step in succession. At each step, signals representing determined time T are derived for each source-receiver pair, the error E is determined, squared, and accumulated, so that at the completion of the master sequence of one hundred forty-four steps and representing "one trial" to obtain an estimated best fit plane, the accumulator 324 in the Determine E circuit (FIG. 18b) stores the sum of the errors squared ($\Sigma(E)^2$) for all the source-receiver pairs of the full set. That quantity is also displayed on the voltmeter dial 206. Master sequence timing pulses operate the requisite gating circuits within the system to carry out the functions involved in the master sequence.

The sub-sequence timing pulses primarily time the operation of the analog system in carrying out a sub-sequence during the interval between the master sequence timing pulses. In each sub-sequence, voltages are derived representing incremental change in determined time T relative to incremental changes in each of the parameters V, c, L and m, and the ratios circuits 334, 350, 352, 354 are operated in succession during the sub-sequence to produce output voltages representing the complex ratios (15), (16), (17) and (18) in order to provide a display indicating the parameter to be adjusted for the next "trial" in obtaining a best fit plane. These sub-sequence timing pulses appear at lines $SS_1$–$SS_{11}$ from the decoder circuit 254 and are utilized as gate drivers where required in the analog system to carry out these sub-sequence operations.

How the timing generator operates to produce these two sets of timing pulses should be clear from a consideration of the circuit detailed in FIG. 16. Thus, the clock oscillator 405 is turned on by actuation of the start switch 400 and feeds pulses at the clock rate (i.e., ninety-six Hz.) to the input gate G which is also opened by the start switch 400 via a high signal from the output of a flip-flop 406 having its set input connected to the start switch 400.

A divide by twelve counter 408 receives the clock pulses and the first clock pulse that produces a carry pulse from the counter 408 to the S counter 410, sets the first flip-flop 412 in the S counter 410, which through the binary to absolute count decoder 240, converts a high voltage on the output line $S_o$ to a low, and shifts a high voltage to the output line $S_1$, representing the first master sequence timing pulse for the analog system. The S counter 410 has a one hundred forty-five count capacity, and for this purpose is comprised of eight flip-flops 412-1–412-11 with interconnected gates (not shown) which make it go through one full counting cycle in response to one hundred forty-six input pulses. Such gating to produce a count cycle of any desired length is routinely organized by one skilled in the art. The S Counter is supplied by pulses from the divide by twelve counter 408 at the rate of 8 Hz. The output from the S Counter represents in binary form on its output terminals 414, the output pulse count from zero to one hundred forty-five ($S_0$ to $S_{145}$) which is decoded in the decoder 240 to advance the high voltage successively from each output line to the next, i.e., $S_1$ to $S_2$ to $S_3$–to $S_{145}$. The master sequence signals are thus provided on the output lines $S_1$–$S_{145}$ in sequence and at the timing rate of 8 Hz. At the completion of the master sequence, i.e., at the end of a "trial" to determine the fit of an estimated plane, a carry pulse is produced from the S counter flip-flop 412-8. It is fed back to reset the flip-flop 402 adjacent the start switch 400, which flip-flop 402 terminates operations by closing the input gate G to the divide by twelve counter 408. The high signal on the final output line $S_{145}$ from the decoder 240 is shifted to the line $S_o$, which turns on a signal light 420 indicating the end of a "trial".

The sub-sequence timing pulses which appear on the output lines $SS_2$–$SS_{11}$ of the binary to absolute decoder 254, appear in succession on these lines at the clock rate of 96 Hz. These ten output lines are made successively high by an SS counter 422. The latter is formed by four tandem flip-flops interconnected by gates (not shown) to cycle successively through twelve count states ($SS_0$ to $SS_{11}$). The decoder lines $S_2$ to $S_{11}$ are respectively high during count states $S_2$ to $S_{11}$.

In the input to the sub-sequence counter 422 is a gate 424 which is enabled by and passes the first pulse of a first twelve clock pulse sequence. Thus, with the S and SS counters in a zero count state, a clock pulse which carries through counter 408 switches the S Counter to the $S_1$ state and this in turn enables gate 424 quickly so that the same first clock pulse switches the SS counter to the $S_1$ state. The second clock pulse switches the SS counter to the $SS_2$ state and the decoder 254 places a high signal on the $SS_2$ output line. Thus, the second pulse of a twelve pulse sequence marks the start of the ten step sub-sequence represented successively on the sub-sequence output lines $SS_2$-$SS_{11}$.

The input gate 424 to the SS counter is enabled by a high output AND gate 426. On the first pulse of a twelve pulse sequence at the very beginning of a 144 step trial, the output line $S_o$ from the decoder 240 shifts from high to low. An inverter 428 thus supplies a high voltage to one input terminal of the AND gate 426. The other input of the AND gate 426 is connected to the output line $S_{145}$ from the decoder 240. That output line $S_{145}$ also carries a low voltage until the S Counter reaches a count state of 145. Such low voltage is converted to a high in the inverter 430. The AND gate 426 thus enables the pulse transmission gate 424 at all times except when the S Counter is in count state $S_0$ or $S_{145}$. During each 144 step trial, the gate 424 is enabled at the start of the count state $S_1$ and disabled at the end of count state $S_{144}$.

Also, shown in FIG. 16 are two clear switches. The first such switch 432 clears the SS counter 422 to a zero count state (in most cases redundantly) after each 144 step trial of the system. Thus, the clear switch 432 is ganged with the start switch 400. A clear switch 434 is also provided to clear the S Counter. That clear switch 434 is ganged with a reset switch 436 which connects a positive voltage to all reset terminals (R) in the summing and storage circuits, or accumulator circuits, found throughout the analog system. The S Counter is cleared when the system is first put into operation and redundantly after each 144 step master sequence or iteration.

ILLUSTRATIVE SEQUENCE

After the preliminary setup of the parameter signal generator and the measured times source-receiver pair signal generator, as earlier stated, and startup of the analog system by actuation of the start switch 400 (FIG. 16) to carry out a first "trial" to derive a best fit plane, the master sequence S Counter operates to shift an output signal from the output line $S_o$ leading from the decoder 240, to the line $S_1$ which corresponds to the first source-receiver pair in the tabulation of source-receiver coordinates and measured reflection time by that source-receiver pair.

The output signal on the line $S_1$ from the S Counter opens the output gates $G_1$ in the t, x and y potentiometer banks of the measured time source-receiver pair signal generator, so that voltages picked off the first potentiometer in each bank energize the output lines (1), (2), (3) and (4) and (5) with signals representing $t_{ij}$ and the x and y coordinate values. The coordinate value output lines (2), (3), (4), (5) bring in the coordinate value signals to the Determine T circuit, which is also supplied with signals representing the original estimates ($V_o$, $c_o$, $L_o$, $m_o$) of the parameter values, and in this stage of operation of the circuit the $\Delta V$, $\Delta c$, $\Delta L$ and $\Delta m$ parameter increments are treated as zero, from the parameter signal generator, and the Determine T circuit functions to produce on its output line (10) a signal representing determined reflection time $T_{ij}$ for that particular source-receiver pair. The Determine E circuit which receives the signals representing $T_{ij}$ from the Determine T circuit also directly receives the measured time signal $t_{ij}$ and functions to produce signals representing the error ($E_{ij} = t_{ij} - T_{ij}$) and error squared $E_{ij}^2$.

As each successive master sequence timing pulse is generated by the decoder 240, at the rate of 8 Hz., representing each step of an iteration, the output lines $S_1$-$S_{145}$ are energized in sequence. The signals representing coordinate values for each succeeding source-receiver pair in the tabulation and signals representing the original estimated parameters, are operated on by the Determine T circuit, and the signals for the error squared $E_{ij}^2$ determined in the Determine E circuit are summed until all one hundred forty-four source-receiver pairs have been covered in the complete iteration for the first trial.

In order to explain in greater detail the sub-sequence which is carried out between each master sequence step, to provide the information to the operator of the analog system as to which parameter should be adjusted for the next trial, we can take as an example the S Counter step which shifts a high voltage from the output line $S_{142}$ to the output line $S_{143}$ representing the shift from the one hundred forty-second to the one hundred forty-third step of the iteration.

A pulse on the $S_{143}$ line will enable the output gates $G_{143}$ in the t, x and y banks of the source-receiver pair measured time signal generator. This results in five output signals representing that one hundred forty-third source-receiver pair in the tabulation (FIG. 14) together with the measured time t by that pair. The coordinate signals are carried into the Determine T circuit and a signal representing determined time T produced. The Determine E circuits produce a signal representing the error squared $E^2$ for that source-receiver pair.

The same clock pulse that is carried into the S Counter to shift its count from 142 to 143, also enables the input gate 424 to the SS Counter. It also will be observed that the output line $S_{143}$ remains high for the period between twelve clock pulses from the clock oscillator. Thus, the first clock pulse of the series of twelve which shifts the master S Counter, enables the input gate to the sub-sequence SS Counter, while the second clock pulse is passed through the input gate 424 to shift the SS Counter, and through the decoder 254 produces a pulse on the output line $SS_2$ which is the first energized line of the ten output lines timing the sub-sequence steps.

In this first sub-sequence step, the previously determined error squared signal is stored in the accumulator 324 in the Determine E circuit, and the determined time T signal produced by the Determine T circuit is stored for subsequent use. Thus, the output line $SS_2$ is connected to the enter terminal (A) of the accumulator 324 of the Determine E circuit, so that the signal representing error squared which is on the input to the accumulator 324 when the timing signal arrives on the line $SS_2$, is entered into the accumulator and summed with the error squared signals previously entered during the prior 142 steps of the master sequence. The line $SS_2$ is also connected to the input gate G to the determined time T sample and hold circuit 382, so as to enable that gate to pass the determined time signal T to the sample and hold circuit 382.

The next sub-sequence step is timed by an output pulse appearing on the output line $SS_3$ of the SS Counter which is produced by the third clock pulse of the twelve pulse series. The timing pulse appearing on the line $SS_3$ is used to operate the V ratios circuit 210 (FIG. 18b). Thus, the output line $SS_3$ is connected to the OR gate in the gating circuits associated with the $\Delta V$ potentiometer 242 in the parameter signal generator (FIG. 17b). With the OR gate enabled by the arriving pulse on the line $SS_3$, the output gate $G_v$ of the $\Delta V$ potentiometer is enabled, and the voltage $\Delta V$ is picked off the potentiometer 242 and passed to the summing amplifier 244 so that the output of this amplifier then appears as $V = V_o + \Delta V$. Thus, the effective $\Delta V$ is changed at this step in the sub-sequence from zero to $\Delta V$. With a changed signal value for the parameter V, the Determine T circuit functions to produce a different value for determined time T, hereinbefore called T'.

The signal representing the value of determined time T' based upon the incremented value of $V = V_o + \Delta V$ is supplied from the output line (10) of the Determine T circuit to the summing amplifier 390 which produces an output signal representing $\Delta T = T' - T$, and the timing signal over line $SS_3$ is also conveyed to enable the output gate $G_v$ from the divider 380 which thus passes into the V ratios circuit a signal representing ($\Delta T/\Delta V$). The next timing pulse produced by the SS Counter over the output line $SS_4$ also holds the output gate $G_v$ from the divider 380 enabled, so that the signal representing ($\Delta T/\Delta V$) is carried for the duration of the $SS_4$ timing pulse into the three summing and storing circuits 328, 330, 332 of the V ratios circuit. The enter lines (A) of each of those summing and storing circuits or accumulators are also connected to the timing line $SS_4$ so that during the time increment represented by the timing pulse over line $SS_4$, the signal representing $E(\Delta T/\Delta V)$ for the one hundred forty-third source-receiver pair is entered into the accumulator 328 and stored therein to produce the sum $\Sigma(E\Delta T/\Delta V)$ for all source-receiver pairs including the one hundred forty-third pair, and that sum is squared in the squaring amplifier and carried to the divider 396. Likewise the signal representing $\Delta T/\Delta V$ is carried into the squaring amplifier 394 and the resulting voltage is carried into the accumulator 330, entered and stored therein and the resulting output voltage carried to the divider 396 which produces the output voltage represented by the Equation (15) for all source-receiver pairs from one to one hundred forty-three, and which will produce a magnitude represented by the dial on the voltmeter 218.

Also, the signal representing $\Delta T/\Delta V$ is carried into the third summing and storing circuit or accumulator 332 of the set in the V ratios circuit, and the value entered and stored therein so as to produce an output signal representing $\Sigma \Delta T/\Delta V$ which is carried to the output voltmeter 226 and represented on the output dial as a positive or negative signal for all source-receiver pairs from one to one hundred forty-three.

With the arrival of the next clock pulse to the SS Counter, the output signal is shifted from the output line $SS_4$ to $SS_5$. During the time increment represented by the next two timing pulses on the output lines $SS_5$ and $SS_6$, the signal representing the original estimated parameter $c_o$ is incremented by a signal representing $\Delta c$, and the Determine T circuit produces an output voltage representing T' based upon the original parameter estimates $V_o$, $L_o$ and $m_o$, but with the parameter c incremented to the value $c = c_o + \Delta c$. The output timing pulse of the line $SS_5$ is effective with the gating circuits associated with the $\Delta c$ potentiometer and the parameter signal generator to pick off a signal representing $\Delta c$ and pass it into the Determine T circuit. The signal produced over the $SS_6$ output line from the SS Counter on the next clock pulse is then effective to operate the set of three accumulators in the c ratios circuit to enter signals representing $E(\Delta T/\Delta c)$, $(\Delta T/\Delta c)^2$ and $\Delta T/\Delta c$ into such accumulators to produce the sum of such signals for all source-receiver pairs one through one hundred forty-three, and output signals which are conveyed to the output voltmeters 360 and 368 associated with the c ratios circuit such that the dials from these voltmeters display the accumulated sums represented by the equations shown adjacent the voltmeters in FIG. 18c.

It should be clear from the foregoing, and referring to FIG. 18c, that the timing pulses appearing on the lines $SS_7$ and $SS_8$ from the S counter operate, respectively, the $\Delta L$ potentiometer gating circuits and the L ratios circuit accumulators to sum the signals representing $E(\Delta T/\Delta L)$, $(\Delta T/\Delta L)^2$ and $\Delta T/\Delta L$ for source-receiver pairs one through one hundred forty-three; and the timing pulses occurring on output lines $SS_9$ and $SS_{10}$ from the S Counter are effective, respectively, to operate the gating circuit associated with the $\Delta m$ potentiometer in the parameter signal generator to increment the signal representing the m parameter and produce a signal $m = m_o + m$, and also to operate the accumulators in the m ratios circuit to enter and store the signals produced as a consequence of the change in determined time T due to the increase in m from the incremental voltage $\Delta m$. In the case of operation of all the ratios circuits, it should be noted that the original estimates of parameters are used except for the incremental value of the particular parameter being operated on in the determination of T. It is also noted that the signal representing $\Delta T$ is different for each successive determination in the sub-sequence but is only gated into the respective ratios circuit by the corresponding sub-sequence timing pulse produced by the sub-sequence decoder.

When the SS Counter shifts to transfer an output pulse from the output line $SS_{10}$ to the output line $SS_{11}$ of the decoder 254, the sample and hold circuit 382 connected to the output of the Determine T circuit is cleared by the signal over line $SS_{11}$ enabling the clear reset gate $G_r$. This clears from the sample and hold circuit 382 the stored value of determined time T for the 143rd source-receiver pair and readies the sample and hold circuit 382 for the next step of the master sequence, which in this example would involve the determination of T for the one hundred and forty-fourth source-receiver pair.

Thus, a timing pulse appearing on the output line $SS_{11}$ from the SS Counter decoder 254 is effective to clear the signal representing determined time T from the sample and hold circuit 382 connected to the output of the Determine T circuit and this is achieved by the signal over line $SS_{11}$ which enables the reset gate $G_r$ and connects ground to the input of the sample and hold circuit 382. The gate $G_r$ connects a zero voltage to the input of the sample and hold circuit 382 and clears it, so that a new value of determined time T can be stored in the sample and hold circuit 382 for the next source-receiver pair, in our illustrative example the 144th pair of the set produced by a twelve-by-twelve cross pattern as shown in FIG. 1.

The final pulse in the twelve pulse series from the clock when received by the SS Counter, rolls over the SS Counter to a zero count state. That same twelfth clock pulse is entered into the S Counter and produces a carry pulse from one flip-flop to the next to advance the S Counter by one state, for example from the 143rd to the 144th count, and results in an output signal on the output line $S_{144}$ from the S Counter decoder 240. A new sub-sequence will then start.

The final pulse of the next twelve pulse series will shift the count from 144 to 145 in the S Counter, producing an output pulse on the line $S_{145}$ which disables the AND gate 426 and, in turn, the input gate 424 to the SS Counter. The output pulse representing the 145th count of the S Counter is also utilized to open a gate associated with the Determine E circuit; the gate 450 is enabled by the 145th timing pulse to transfer the output of the accumulator 324 which holds at that stage of the master iteration, a signal representing the sum of the error squared for all source-receiver pairs in that trial, and enters that signal to a sample and hold circuit 452 and as such represents error squared $(E)^2$ for the just concluded trial. The voltmeter connected to the output of the sample and hold circuit 452 displays the previous trial sum of the errors squared for reference after the next iteration has been carried out. With the S Counter having a 145 count capacity, the next input pulse entered to the S Counter, the 145th input pulse, appears as a carry from the final flip-flop 412-8 in the series which is carried back to the reset input of the flip-flop 402 associated with the start switch 400, to reset that flip-flop and in turn close the input gate G to the S Counter. This terminates the operation of the analog system after a full iteration and trial at a best fit plane to the measured reflection time data for all source-receiver pairs of a set. The binary to absolute count decoder 240, when the S Counter is set to a zero count by the 146th timing pulse, is shifted to its zero state causing an output signal to appear on its output line $S_o$ and light the indicator light 420, thus indicating that a trial is completed.

After a trial at fitting an estimated plane to the measured time travel signals, carried out with the analog system as described, in accordance with the method invention another trial to obtain a better fit of an estimated plane to the measured time travel signals is taken based upon a new set of values for the parameters V, c, L, m. In the step-wise Gauss-Newton iteration which may be programmed for a digital computer and which follows the Computational Procedure outlined in the portion reproduced above from the BMD publication, after a first iteration has been completed, the parameter of greatest signficance in the error squared value is selected and that parameter adjusted in succeeding iterations until a minimum error squared is obtained for that parameter. That procedure is repeated for each parameter in the order of relative importance until all four parameters have been adjusted, and the process involving multiple iterations with adjustment of all four parameters may be repeated until a minimum error squared is obtained within a given tolerance factor, thus indicating a best fit plane.

It should be evident that such a procedure may be carried out with the analog computer counterpart disclosed herein; the operator after completing the first trial examines the dials of two sets of output voltmeters, the magnitude voltmeters 358, 360, 362, 364 and the sign voltmeters 366, 368, 370, 372. The magnitude voltmeters will indicate by the dial displaying the largest magnitude which parameter is of greatest sensitivity. The associated voltmeter of the sign voltmeter set will indicate by the sense displayed whether the sensitive parameter should be incremented or decremented. With the parameter and its sign so indicated, the potentiometers for that parameter and the parameter signal generator, i.e., the v, c, L or m potentiometer, is adjusted as a precedent to taking the next trial. The Δ potentiometer settings may be left undisturbed for the next trial and all succeeding trials of a best fit determination until the final adjustments when finer increments than those utilized initially may be established, if the system accuracy warrants such fine adjustments.

DISPLAY OF STRIKE, DIP AND VELOCITY

Once the best fit plane is obtained, the value of $V_o$ used in the final determination will represent the actual velocity of seismic energy in the layers between the earth's surface and the reflecting plane. The values of $c_o$, $L_o$ and $m_o$ used in the final determination may be used for determining strike and dip of the reflecting plane by the following geometrical relations.

If $\theta$ is the angle of dip of the reflecting plane, and $\phi$ is the azimuth of the dip (clockwise from north), then:

$$\cos \theta = n = \sqrt{1 - L^2 - m^2}$$

and $$\phi = \text{Arc Tan}\left(\frac{L}{m}\right) + 180°$$

Referring to FIG. 20, suitable display arrangements for velocity and the reflecting plane parameters, together with strike and dip of the selected strata, are illustrated revealing more detailed exemplary circuitry than in the overall block diagram of FIG. 15; the latter figure shows that the signals representing the parameter values used in the best fit reflecting plane determination serve as the input signals to a display panel 260. As depicted in FIG. 20, for providing a visual representation of the geometrical parameters $c_o$, $L_o$ and $m_o$ of the best fit plane, signals representing these values from the input terminals (12), (13), (14) and (15) are conveyed to analog to digital converters 454 which interface with and drive numeric display devices 456, 458, 460 to display the values $K_c$, $K_L$ and $K_m$. Likewise the value for actual velocity $V_o$ used in the final determination, is conveyed to an analog-to-digital converter 462 which inrterfaces and drives its display 464 of velocity $K_V$.

To produce signals representing strike, the signals representing parameters $L_o$ and $m_o$ are conveyed through a divider circuit 470 to an analog to digital converter 472 and to a digital adder 476, which converter 472 supplies a digital representation of the ratio $L_o/m_o$, to a memory device 474 storing arc tan values. The memory device 474 produces as its output signals representing arc tan $L_o/m_o$ in digital form with the correct quadrant being assigned by the digital adder 476, which interfaces and drives a numeric display 478 for the azimuth of the dip or "strike". To display dip on a numeric display 480, signals representing the parameters $m_o^2$ and $L_o^2$ are supplied to the operational amplifier 482 to produce a signal representing $1 - L_o^2 - m_o^2$, which is operated on in the square root amplifier 484 to provide a signal representing cosine of the dip angle $\theta$ (cos $\theta$). That cos $\theta$ signal is converted to a digital signal in the analog-to-digital converter 486, and by the arc cos memory circuit 488 produces a digital signal displayed on a numeric display 480. To display a digital representation of the parameter n, the analog to digital converter 486 outputs to the numeric display unit 490 to display n directly.

Following the display of strike, dip and velocity determined for a selected stratum underlying a particular source-receiver cross pattern layout, for example the shallowest reflecting plane evidenced by the trace data pictorially represented in FIGS. 13a–c and reflecting times $T_{(1)}$, another stratum evidenced by the data may be selected, for example the next deeper reflecting plane for which reflection times are listed on the tabulation in FIG. 14, and the method of this invention carried out to obtain strike, dip and velocity related to that selected stratum. The procedure may be repeated for all the reflection planes listed on the tabulation, which then finishes the interpretation of recorded data from a particular source-receiver cross pattern layout.

Where SDV data has been recorded at a number of source-receiver cross pattern layouts located throughout an area, in accordance with the method of this invention the data for each layout may be processed following the procedure detailed above, and from the strike and dip determined for each layout, a plot like that of FIG. 10 may be prepared. FIG. 10 shows the results of the method as applied over a very large area of rough terrain. As mentioned earlier herein, each of the source-receiver cross pattern layouts noted on FIG. 10 was placed down at about six to seven mile intervals. Each of these layouts is designated on FIG. 10 as A-2-A-5, B-2-B-5, C-2-C-5, D-2-D-5, E-2. After processing of the data recorded at each location, in accordance with the present invention, strike and dip was determined for a selected stratum extending throughout the area, and the strike and dip determinations have been recorded on FIG. 10 at each of the cross-pattern locations. At each location a directional arrow shows the direction of dip and the printed numeral close by gives the measurement of dip angle $\theta$ in degrees. FIG. 11 is an average velocity plot using the average velocities which were determined together with a strike and dip for each location on FIG. 10. These average velocities are contoured on FIG. 11.

Other alternatives will occur to those skilled in this art to the plan view mapping of FIGS. 10 and 11 in making geological interpretations using strike, dip and velocity according to the method of this invention, and these plots have been referred to for illustration only.

The individual components which are shown throughout FIGS. 15–20 (e.g., operational amplifiers, sample and hold circuits, multipliers, counters, dividers, decoders, converters, etc.) are all per se known to those skilled in the art. It is thus unnecessary to describe each of these components in greater detail. Of course, variations of the system shown in FIGS. 15–20 may be be readily adopted by those skilled in the art. It will be seen that the system of FIGS. 15–20 functions wholly with analog circuits and analog voltage signals but in a manner which is fully parallel to the operation of the digital system described earlier with reference to FIGS. 1–12. Noteworthy is the fact that in both embodiment of FIGS. 1–12 and the embodiment of FIGS. 15–20, there are means for producing from original trace data measured time of travel signals for each of plural source-receiver pairs, the measured time of travel signals representing measured time of travel of a seismic event reflected from a reflection point at a selected stratum. Moreover, there are means for producing parameter signals representing parameters defining an estimated plane underlying the earth's surface. Still further, in both embodiments there are means for producing estimated time of travel signals for each of the plural source-receiver pairs, the estimated time of travel signals representing time of travel of seismic energy reflected from an estimated plane. Finally there are in both embodiments included means for producing error signals representing the difference for each of the plural source-receiver pairs between the measured time of travel signals and the estimated time of travel signals, and for adjusting the parameter signals until the error signals are brought to a minimum value and an estimated plane is obtained which best fits the measured time of travel signals. The attitude and azimuth of the best fit plane provides the dip and strike of the selected stratum. While the system of FIGS. 15–20 is not a preferred embodiment because it may involve more manufacturing expense, labor and time of operation as compared to the embodiment of FIGS. 1–12, the second embodiment of FIGS. 15–20 confirms that those skilled in the art may practice the method of the present invention with analog components and signals and without employing a programmed digital computer.

We claim:

1. A method of reconnaissance geophysical prospecting to derive the configuration directly of a selected stratum underlying the earth's surface comprising:
   collecting seismic data by performing the steps of:
   placing a plurality of seismic energy sources in spaced relationship along a source line disposed on the earth's surface;
   placing a plurality of seismic energy receivers in spaced relationship along a receiver line disposed on the earth's surface and positioned to bisect said source line generally perpendicularly;
   each of said energy sources and receivers having a known location relative to an origin;
   obtaining seismic trace data for events reflected from said selected stratum, said trace data being compiled of traces representative of seismic energy events traveling from respective sources to each receiver and reflected from reflection points at said selected stratus and wherein the reflection points form patterns disposed in spaced quadrantal relationship to the crossed source and receiver lines; and
   processing said seismic data by performing the following steps with automatic computing apparatus:
   producing from said trace data measured time of travel signals for each of plural source-receiver pairs included in said crossed lines, said measured time of travel signals representing measured time of travel of one of said events reflected from a reflection point at said selected stratum;
   producing parameter signals representing parameters defining, relative to said origin, an estimated plane underlying the earth's surface;
   producing estimated time of travel signals for each of said plural source-receiver pairs, said estimated time of travel signals representing time of travel of seismic energy reflected from said estimated plane;
   producing error signals representing the difference for each of said plural source-receiver pairs between said measured time of travel signals and said estimated time of travel signals;
   adjusting all said parameter signals until said error signals are brought to a minimum value and an estimated plane is obtained which best fits said measured time of travel signals, and
   providing output indication of the attitude and azimuth of said best fit plane to depict the dip and strike of said selected stratum.

2. A method according to claim 1 wherein said parameter signals represent geometrical parameters mathematically defining an estimated plane and velocity of seismic energy between the earth's surface and said estimated plane;

wherein said step of adjusting all said parameter signals includes adjusting parameter signals representing said parameter of velocity, and the velocity parameter used in making the best fit determination provides the actual velocity of seismic energy in the layers between the earth's surface and the selected substratum.

3. A method as set forth in claim 2 wherein said step of adjusting all said parameter signals is iterated on each of the parameters until the square of said error signals is brought to a minimum by the method of least squares.

4. A method as set forth in claim 1 which is further characterized in that:

said seismic trace data for each quadrant is compiled from energy from successive seismic energy sources positioned on the same side of the receiver line, as reflected from reflection points at said stratum for detection at each receiver at the same end of the receiver line.

5. A method as set forth in claim 1 which is further characterized in that:

said source line and receiver line include plural spaced sources and receivers, respectively, as disposed along both extremities of each of said lines.

6. A method as set forth in claim 1 which is further characterized in that:

said steps of placing sources and receivers, and obtaining trace data, are carried out at each of plural, separated earth positions;

said steps of producing measured time of travel signals, producing parameter signals, producing estimated time of travel signals, producing error signals and adjusting parameter signals until said error signals are brought to a minimum, are carried out for each of said earth positions to obtain a separate, best fit plane for a selected stratum underlying each of said earth positions; and the dip and strike for all said selected stratums taken together provide overall dip amount and strike for the general area which includes all said earth positions.

7. A method as set forth in claim 6 wherein said parameter signals represent parameters defining an estimated plane and velocity of seismic energy between the respective earth positions and an underlying selected substratum, and the velocity parameter used in making the best fit determination for each position provides the actual velocity of seismic energy at that position.

8. A method as set forth in claim 5 wherein measured time of travel signals are produced from trace data representative of events reflected from reflection points in all quadrants and a best fit plane is obtained which is common to all quadrantal related reflection point patterns.

9. A method of deriving the configuration directly of a selected substrata underlying an earth location, comprising:

collecting seismic data by performing the steps of:

positioning an equi-spaced line of seismic energy sources generally perpendicular to and intersecting said line of seismic energy receivers;

each of said energy sources and receivers having a known location relative to an origin;

energizing each of said sources sequentially and recording energy data received by all said receivers for each sequential source energization; and processing said seismic data by performing the following steps with automatic computing apparatus:

producing from said recorded energy data measured time of travel signals for each of plural source-receiver pairs included in said intersecting lines, said measured time of travel signals representing measured time of travel of energy reflected from reflection points at said selected stratum;

producing parameter signals representing parameters defining, relative to said origin, an estimated plane underlying the earth's location and representing velocity of seismic energy between the earth's location and said estimated plane;

producing estimated time of travel signals for each of said source-receiver pairs, said estimated time of travel signals representing time of travel of energy reflected from said estimated plane;

comparing said measured time of travel signals and said estimated time of travel signals; and adjusting all said parameter signals until said error signals are brought to a minimum value, and an estimated plane is obtained which best fits said measured time of travel signals; and providing output indication of the attitude and azimuth of said best fit plane to provide the dip and strike of said selected substrata, and the velocity parameter used in making the best fit determination to provide the actual velocity of seismic energy between the earth location and the selected substrata.

10. A method as set forth in claim 9 which includes the further steps of:

positioning a second equi-spaced line of seismic energy receivers disposed in generally perpendicular intersection with a second equi-spaced line of sources at a second spaced point on said earth location;

energizing each of said second sources sequentially and recording energy data received by all said second receivers for each sequential source energization; and said steps of producing signals and adjusting parameter signals until said error signals are brought to a minimum, are carried out for each of plural source-receiver pairs included in said second lines of sources and receivers to obtain a separate, best fit plane for said selected substrata underlying the spaced earth location and dip and strike for said selected substrata and actual velocity of seismic energy at that location.

11. A method as set forth in claim 10 wherein measured time of travel signals are produced from seismic data recorded for all quadrature arrayed reflection points to provide a separate best fit plane for each location and a trend display of dip, strike and velocity for a selected substrata underlying the entire expanse of earth locations.

12. In a method of collecting and processing seismic energy data for selected substrata underlying an earth location where said data is collected by cross-pattern energization of plural seismic energy sources in linear, equi-spaced array which is positioned generally perpendicular to said source array, each of said energy sources and receivers having a known location relative to an origin, the method of processing said seismic energy data by performing the following steps:

assembling seismic energy trace data for a selected substrata as received by said plural seismic energy receivers for each of said energized seismic energy sources thereby to define reflection times for a quadrature array of energy reflection point groups at said substrata; and performing the following steps with automatic computing apparatus;

producing parameter signals representing parameters defining, relative to said origin, a plane which best fits said defined reflection times for and is common to said energy reflection point groups at said substrata, said plane thereby representing the configuration of a portion of the selected substrata including said energy reflection point groups; and providing output indication of the attitude and azimuth of said best fit plane to provide the dip and strike of said portion of the selected stratum.

13. A method as set forth in claim 12 which includes the steps of:

assembling seismic energy data derived from a second cross-pattern energization for said selected substratum underlying said earth formation at a spaced distance therefrom, thereby to define a second quadrature array of energy reflection point groups;

producing parameter signals representing parameters defining a separate best fit plane common to said second quadrature array of reflection point groups; and from said parameter signals deriving an indication of an attitude trend for the selected substratum underlying the first earth location and extending through said spaced earth formation.

14. A method as set forth in claim 13 which further comprises the steps of:

producing parameter signals representing parameters defining separate best fit planes and velocity at each said earth formation; and from said parameter signals determining strike, dip and velocity of incident seismic energy, to provide a trend display of said data over the inclusive earth location.

15. A method as set forth in claim 14 which further includes the steps of:

adjusting said parameter signals for each said earth formation until a best fit estimated plane through the seismic trace data for each quadrant reflection point group is obtained by the method of least squares, thereby to provide a generally planar attitude indication of said selected substratum underlying said expanse of earth formation.

16. A method of geophysical prospecting to derive the approximate configuration directly of a selected stratum underlying the earth's surface comprising:

collecting seismic data by performing the steps of:
placing a plurality of spaced seismic energy sources on the earth's surface,
placing a plurality of spaced seismic energy receivers on the earth's surface to receive seismic energy events emanating from said sources and reflected from reflection points extending throughout a region of said selected stratum;
each of said energy sources and receivers having a known location relative to an origin;
obtaining trace data compiled of traces representative of said seismic energy events and establishing reflection times of said events; and
processing said seismic data by performing the following steps with automatic computing apparatus:

producing from said seismic trace data measured time of travel signals for source-receiver pairs of said sources and receivers, said measured time of travel signals representing said reflection times of said events;

producing parameter signals representing parameters defining, relative to said origin, a plane best fitting said measured time of travel signals and approximating the configuration of said selected stratum region; and, providing output indication based on said parameters of said best fitting plane, the strike and dip of said selected stratum region.

17. The method set forth in claim 16 wherein said parameters defining an estimated plane include geometrical parameters mathematically defining an estimated plane comprising direction angles of a line perpendicular to said estimated plane extending to the earth surface, and the length of said line.

18. The method of determining the configuration directly of a selected stratum underlying the earth's surface, comprising:

collecting seismic data by performing the steps of:
setting out a cross pattern of recorders and seismic sources on the earth's surface;
each of said energy sources and receivers having a known location relative to an origin;
obtaining time of travel data for each of plural source-receiver pairs in said cross pattern including measured time of travel for each said source-receiver pair of seismic energy reflected from said selected stratum by sequentially energizing said seismic sources and recording reflected seismic energy with said recorders; and
processing said seismic data by performing the following steps with automatic computing apparatus;
producing measured time of travel signals (t) representing said time of travel data for each said source-receiver pair;
producing parameter signals (c, L, m and V) representing geometrical parameters (c, L and m) mathematically defining, relative to said origin, an estimated plane underlying the earth's surface and representing velocity (V) of seismic energy between the earth's surface and said estimated plane;
producing from said parameter signals estimated plane time of travel signals (T) representing time of travel for each said source-receiver pair of seismic energy reflected from said estimated plane;
producing error signals (E) representing the difference for each said source-receiver pair between said measured time of travel signals (t) and said estimated plane time of travel signals (T);
adjusting all said parameter signals until said error signals (E) are brought to a minimum value and an estimated plane is obtained which best fits said time of travel data; and
providing output indication of the attitude and azimuth of said best fit plane for providing the dip and strike of said selected stratum, and the velocity used in making the best fit determination for providing the actual velocity of seismic energy in the layers between the earth's surface and said selected stratum.

19. A method of reconnaissance geophysical prospecting to derive the configuration directly of a selected stratum underlying the earth's surface comprising:

collecting seismic data by performing the steps of:

placing a plurality of spaced seismic energy sources and a plurality of spaced seismic energy receivers in a crossed line relationship on the earth's surface;

each of said energy sources and receivers having a known location relative to an origin;

obtaining seismic trace data for events reflected from said selected stratum, said trace data being compiled of traces representative of seismic energy events traveling from respective sources to each receiver and reflected from reflection points at said selected stratum and wherein the reflection points form patterns disposed in spaced quadrantal relationship to the crossed source and receiver lines; and processing said seismic data by performing the following steps with automatic computing apparatus;

producing from said seismic trace data measured time of travel signals for said seismic energy events reflected from said reflection points;

producing parameter signals representing parameters defining, relative to said origin, an estimated plane which best represents a portion of said selected stratum common to said patterns of reflection points;

producing estimated time of travel signals representing time of travel if seismic energy events in reflection point patterns at said estimated plane similar to said reflection point patterns at said selected stratum;

producing error signals representing the difference for said reflection point patterns between said measured time of travel signals and said estimated time of travel signals;

adjusting all said parameter signals until said error signals are brought to a minimum value and an estimated plane is obtained which best fits said measured time of travel signals; and providing output indication of the attitude and azimuth of said best fit plane for providing the dip and strike of said selected stratum.

20. A method of reconnaissance geophysical prospecting to derive the configuration directly of a selected stratum underlying the earth's surface comprising:

collecting seismic data by performing the steps of:

placing a plurality of seismic energy sources in spaced relationship along a source line disposed on the earth's surface;

placing a plurality of seismic energy receivers in spaced relationship along a receiver line disposed on the earth's surface and positioned to bisect said source line generally perpendicularly;

each of said energy sources and receivers having a known location relative to an origin;

obtaining seismic trace data establishing reflection times for events reflected from said selected stratum, said trace data being compiled of traces representative of seismic energy events traveling between source-receiver pairs and reflected from reflection points at said selected stratum and wherein the reflection points form patterns disposed in spaced quadrantal relationship to the crossed source and receiver lines; and processing said seismic data by performing the following steps with automatic computing apparatus;

producing parameter signals representing a plurality of parameters defining, relative to said origin, an estimated plane, producing signals representing estimated reflection times for events reflected from said estimated plane for at least as many source-receiver pairs as said plurality of parameters, adjusting said parameter signals until the error between said actual and estimated reflection time representing signals is minimized to obtain an estimated plane which best fits the reflection times established by said trace data, said best fit plane thereby representing the configuration of said selected stratum, determining the attitude and azimuth of said best fit plane, and based on said attitude and azimuth providing output indication of the dip and strike of said selected stratum.

21. A method according to claim 20 wherein said parameter signals represent geometrical parameters mathematically defining an estimated plane and velocity of seismic energy between the earth's surface and said estimated plane;

and said step of utilizing said trace data to produce parameter signals defining a best fit plane includes a step of adjusting parameter signals representing all said parameters of an estimated plane until said best fit plane is determined, and the velocity parameter used in making the best fit determination provides the actual velocity of seismic energy in the layers between the earth's surface and the selected substratum.

22. A method as set forth in claim 21 wherein said step of adjusting said parameter signals is iterated on each of the parameters until the square of the error representing the variance between actual and estimated reflection times representing signals is brought to a minimum by the method of least squares.

23. A method of geophysical prospecting to derive the configuration directly of a selected stratum underlying the earth's surface comprising:

collecting seismic data by performing the steps of:

placing spaced plural seismic energy sources in local association with spaced plural seismic energy receivers at a location over said selected stratum;

obtaining seismic trace data establishing reflection times for events reflected from a plurality of non-linearly related, spaced reflection points at said selected stratum, said trace data being compiled of traces representative of seismic energy events traveling between source-receiver pairs at known locations and reflected from said reflection points at said selected stratum;

and processing said seismic data by performing the following steps with automatic computing apparatus:

producing parameter signals representing parameters defining an estimated plane having a known geometrical relationship to said source-receiver pairs, and adjusting said parameter signals to obtain an estimated plane which best fits travel times established by said trace data for at least four of said source-receiver pairs, said best fit plane thereby representing the configuration of said selected stratum, and deriving and providing output indication of the attitude and aximuth of said best fit plane to provide the dip and strike of said selected stratum.

24. A method of geophysical prospecting to derive the approximate configuration directly of a selected stratum underlying the earth's surface comprising:

collecting seismic data by performing the steps of:

placing a plurality of spaced seismic energy sources on the earth's surface, placing a plurality of spaced seismic energy receivers on the earth's surface to receive seismic energy events emanating from said sources and reflected from reflection points spaced from each other over a region of said selected stratum;

each of said energy sources and receivers having a known location relative to an origin;

obtaining trace data compiled of traces representative of said seismic energy events over independent travel paths between source-receiver pairs at known locations and establishing reflection times of said events; and processing said seismic data by performing the following steps with automatic computing apparatus;

producing from said seismic trace data measured time of travel signals for source-receiver pairs of said sources and receivers, said measured time of travel signals representing said reflection times of said events; and producing parameter signals representing a plurality of parameters defining an estimated surface best fitting said reflection times and approximating said selected stratum region, producing estimated time of travel signals for events between said source-receiver pairs and reflected from said estimated surface, determining a best fitting estimated surface by comparing said measured and said estimated time of travel signals for at least as many independent travel paths as said parameters, and providing output indication of dip and strike of selected portions of said best fitting estimated surface to depict the configuration of the selected stratum.

* * * * *